US011334726B1

(12) United States Patent
Platt et al.

(10) Patent No.: US 11,334,726 B1
(45) Date of Patent: *May 17, 2022

(54) APPLIED ARTIFICIAL INTELLIGENCE TECHNOLOGY FOR USING NATURAL LANGUAGE PROCESSING TO TRAIN A NATURAL LANGUAGE GENERATION SYSTEM WITH RESPECT TO DATE AND NUMBER TEXTUAL FEATURES

(71) Applicant: Narrative Science Inc., Chicago, IL (US)

(72) Inventors: Daniel Joseph Platt, Chicago, IL (US); Nathan D. Nichols, Chicago, IL (US); Michael Justin Smathers, Chicago, IL (US); Jared Lorince, Skokie, IL (US)

(73) Assignee: NARRATIVE SCIENCE INC., Chicago, IL (US)

( * ) Notice: Subject to any disclaimer, the term of this patent is extended or adjusted under 35 U.S.C. 154(b) by 186 days.

This patent is subject to a terminal disclaimer.

(21) Appl. No.: 16/444,718

(22) Filed: Jun. 18, 2019

Related U.S. Application Data

(60) Provisional application No. 62/691,197, filed on Jun. 28, 2018.

(51) Int. Cl.
*G06F 40/56* (2020.01)
*G06N 20/00* (2019.01)
(Continued)

(52) U.S. Cl.
CPC ............ *G06F 40/56* (2020.01); *G06F 40/253* (2020.01); *G06F 40/295* (2020.01); *G06F 40/30* (2020.01); *G06N 20/00* (2019.01)

(58) Field of Classification Search
CPC ........ G06F 40/56; G06F 40/30; G06F 40/253; G06F 40/295; G06N 20/00
(Continued)

(56) References Cited

U.S. PATENT DOCUMENTS 4,992,939 A 2/1991 Tyler
5,619,631 A 4/1997 Schott
(Continued)

FOREIGN PATENT DOCUMENTS

WO 9630844 A1 10/1996
WO 2006122329 A2 11/2006
(Continued)

OTHER PUBLICATIONS

Allen et al., "StatsMonkey: A Data-Driven Sports Narrative Writer", Computational Models of Narrative: Papers from the AAAI Fall Symposium, Nov. 2010, 2 pages.
(Continued)

*Primary Examiner* — Thuykhanh Le
(74) *Attorney, Agent, or Firm* — Thompson Coburn LLP

(57) ABSTRACT

Disclosed herein is computer technology that applies natural language processing (NLP) techniques to training data to generate information used to train a natural language generation (NLG) system to produce output that stylistically resembles the training data. In this fashion, the NLG system can be readily trained with training data supplied by a user so that the NLG system is adapted to produce output that stylistically resembles such training data. In an example, an NLP system detects a plurality of linguistic features in the training data. These detected linguistic features are then aggregated into a specification data structure that is arranged for training the NLG system to produce natural language output that stylistically resembles the training data. Parameters in the specification data structure can be linked to objects in an ontology used by the NLG system to facilitate the training of the NLG system based on the detected linguistic features.

46 Claims, 31 Drawing Sheets

(51) Int. Cl.
  *G06F 40/30* (2020.01)
  *G06F 40/253* (2020.01)
  *G06F 40/295* (2020.01)

(58) Field of Classification Search
  USPC .......................................................... 704/9
  See application file for complete search history.

(56) References Cited

U.S. PATENT DOCUMENTS

| | | |
|---|---|---|
| 5,734,916 A | 3/1998 | Greenfield et al. |
| 5,794,050 A | 8/1998 | Dahlgren et al. |
| 5,802,495 A | 9/1998 | Goltra |
| 5,999,664 A | 12/1999 | Mahoney et al. |
| 6,006,175 A | 12/1999 | Holzrichter |
| 6,144,938 A | 11/2000 | Surace et al. |
| 6,278,967 B1 | 8/2001 | Akers et al. |
| 6,289,363 B1 | 9/2001 | Consolatti et al. |
| 6,651,218 B1 | 11/2003 | Adler et al. |
| 6,665,666 B1 | 12/2003 | Brown et al. |
| 6,757,362 B1 | 6/2004 | Cooper et al. |
| 6,771,290 B1 | 8/2004 | Hoyle |
| 6,917,936 B2 | 7/2005 | Cancedda |
| 6,968,316 B1 | 11/2005 | Hamilton |
| 6,976,031 B1 | 12/2005 | Toupal et al. |
| 6,976,207 B1 | 12/2005 | Rujan et al. |
| 7,027,974 B1 | 4/2006 | Busch et al. |
| 7,246,315 B1 | 7/2007 | Andrieu et al. |
| 7,324,936 B2 | 1/2008 | Saldanha et al. |
| 7,333,967 B1 | 2/2008 | Bringsjord et al. |
| 7,496,621 B2 | 2/2009 | Pan et al. |
| 7,577,634 B2 | 8/2009 | Ryan et al. |
| 7,610,279 B2 | 10/2009 | Budzik et al. |
| 7,617,199 B2 | 11/2009 | Budzik et al. |
| 7,617,200 B2 | 11/2009 | Budzik et al. |
| 7,627,565 B2 | 12/2009 | Budzik et al. |
| 7,644,072 B2 | 1/2010 | Budzik et al. |
| 7,657,518 B2 | 2/2010 | Budzik et al. |
| 7,716,116 B2 | 5/2010 | Schiller |
| 7,778,895 B1 | 8/2010 | Baxter et al. |
| 7,825,929 B2 | 11/2010 | Kincaid |
| 7,836,010 B2 | 11/2010 | Hammond et al. |
| 7,840,448 B2 | 11/2010 | Musgrove et al. |
| 7,856,390 B2 | 12/2010 | Schiller |
| 7,865,496 B1 | 1/2011 | Schiller |
| 7,930,169 B2 | 4/2011 | Billerey-Mosier |
| 8,046,226 B2 | 10/2011 | Soble et al. |
| 8,311,863 B1 | 11/2012 | Kemp |
| 8,355,903 B1 | 1/2013 | Birnbaum et al. |
| 8,374,848 B1 | 2/2013 | Birnbaum et al. |
| 8,442,940 B1 | 5/2013 | Faletti et al. |
| 8,447,604 B1 | 5/2013 | Chang |
| 8,463,695 B2 | 6/2013 | Schiller |
| 8,468,244 B2 | 6/2013 | Redlich et al. |
| 8,494,944 B2 | 7/2013 | Schiller |
| 8,515,737 B2 | 8/2013 | Allen |
| 8,612,208 B2 | 12/2013 | Cooper et al. |
| 8,630,844 B1 | 1/2014 | Nichols et al. |
| 8,630,912 B2 | 1/2014 | Seki et al. |
| 8,630,919 B2 | 1/2014 | Baran et al. |
| 8,676,691 B2 | 3/2014 | Schiller |
| 8,688,434 B1 | 4/2014 | Birnbaum et al. |
| 8,762,133 B2 | 6/2014 | Reiter |
| 8,762,134 B2 | 6/2014 | Reiter |
| 8,762,285 B2 | 6/2014 | Davis et al. |
| 8,775,161 B1 | 7/2014 | Nichols et al. |
| 8,812,311 B2 | 8/2014 | Weber |
| 8,843,363 B2 | 9/2014 | Birnbaum et al. |
| 8,886,520 B1 | 11/2014 | Nichols et al. |
| 8,892,417 B1 | 11/2014 | Nichols et al. |
| 8,892,419 B2 | 11/2014 | Lundberg et al. |
| 8,903,711 B2 | 12/2014 | Lundberg et al. |
| 8,977,953 B1 | 3/2015 | Pierre et al. |
| 9,135,244 B2 | 9/2015 | Reiter |
| 9,164,982 B1 | 10/2015 | Kaeser |
| 9,208,147 B1 | 12/2015 | Nichols et al. |
| 9,244,894 B1 | 1/2016 | Dale et al. |
| 9,251,134 B2 | 2/2016 | Birnbaum et al. |
| 9,323,743 B2 | 4/2016 | Reiter |
| 9,336,193 B2 | 5/2016 | Logan et al. |
| 9,348,815 B1 | 5/2016 | Estes et al. |
| 9,355,093 B2 | 5/2016 | Reiter |
| 9,396,168 B2 | 7/2016 | Birnbaum et al. |
| 9,396,181 B1 | 7/2016 | Sripada et al. |
| 9,396,758 B2 | 7/2016 | Oz et al. |
| 9,405,448 B2 | 8/2016 | Reiter |
| 9,424,254 B2 | 8/2016 | Howald et al. |
| 9,430,557 B2 | 8/2016 | Bhat et al. |
| 9,460,075 B2 | 10/2016 | Mungi et al. |
| 9,529,795 B2 | 12/2016 | Kondadadi et al. |
| 9,535,902 B1 | 1/2017 | Michalak et al. |
| 9,576,009 B1 | 2/2017 | Hammond et al. |
| 9,665,259 B2 | 5/2017 | Lee et al. |
| 9,697,178 B1 | 7/2017 | Nichols et al. |
| 9,697,192 B1 | 7/2017 | Estes et al. |
| 9,697,197 B1 | 7/2017 | Birnbaum et al. |
| 9,697,492 B1 | 7/2017 | Birnbaum et al. |
| 9,720,884 B2 | 8/2017 | Birnbaum et al. |
| 9,720,899 B1 | 8/2017 | Birnbaum et al. |
| 9,741,151 B2 | 8/2017 | Breedvelt-Schouten et al. |
| 9,767,145 B2 | 9/2017 | Prophete et al. |
| 9,773,166 B1 | 9/2017 | Connor et al. |
| 9,792,277 B2 | 10/2017 | Srinivasan |
| 9,870,362 B2 | 1/2018 | Lee et al. |
| 9,870,629 B2 | 1/2018 | Cardno et al. |
| 9,946,711 B2 | 4/2018 | Reiter et al. |
| 9,971,967 B2 | 5/2018 | Bufe, III et al. |
| 9,977,773 B1 | 5/2018 | Birnbaum et al. |
| 9,990,337 B2 | 6/2018 | Birnbaum et al. |
| 10,019,512 B2 | 7/2018 | Boyle et al. |
| 10,037,377 B2 | 7/2018 | Boyle et al. |
| 10,049,152 B2 | 8/2018 | Ajmera et al. |
| 10,068,185 B2 | 9/2018 | Amershi et al. |
| 10,073,861 B2 | 9/2018 | Shamir et al. |
| 10,095,692 B2 | 10/2018 | Song et al. |
| 10,101,889 B2 | 10/2018 | Prophete et al. |
| 10,115,108 B1 | 10/2018 | Gendelev et al. |
| 10,162,900 B1 | 12/2018 | Chatterjee et al. |
| 10,185,477 B1 | 1/2019 | Paley et al. |
| 10,268,678 B2 | 4/2019 | Qiu et al. |
| 10,332,297 B1 | 6/2019 | Vadodaria |
| 10,339,423 B1 | 7/2019 | Dinerstein et al. |
| 10,387,970 B1 | 8/2019 | Wang et al. |
| 10,416,841 B2 | 9/2019 | Riche et al. |
| 10,489,488 B2 | 11/2019 | Birnbaum et al. |
| 10,565,308 B2 | 2/2020 | Reiter |
| 10,621,183 B1 | 4/2020 | Chatterjee et al. |
| 10,657,201 B1 | 5/2020 | Nichols et al. |
| 10,679,011 B2 | 6/2020 | Galitsky |
| 10,699,079 B1 | 6/2020 | Paley et al. |
| 10,706,236 B1 | 7/2020 | Platt et al. |
| 10,726,061 B2 | 7/2020 | Chu et al. |
| 10,747,823 B1 | 8/2020 | Birnbaum et al. |
| 10,755,046 B1 | 8/2020 | Lewis Meza et al. |
| 10,810,260 B2 | 10/2020 | Chen et al. |
| 10,853,583 B1 | 12/2020 | Platt et al. |
| 11,030,697 B2 | 6/2021 | Erard et al. |
| 11,055,497 B2 | 7/2021 | Noh et al. |
| 2002/0046018 A1 | 4/2002 | Marcu et al. |
| 2002/0083025 A1 | 6/2002 | Robarts et al. |
| 2002/0107721 A1 | 8/2002 | Darwent et al. |
| 2003/0004706 A1 | 1/2003 | Yale et al. |
| 2003/0061029 A1 | 3/2003 | Shaket |
| 2003/0182102 A1 | 9/2003 | Corston-Oliver et al. |
| 2003/0216905 A1 | 11/2003 | Chelba et al. |
| 2004/0015342 A1 | 1/2004 | Garst |
| 2004/0034520 A1 | 2/2004 | Langkilde-Geary et al. |
| 2004/0068691 A1 | 4/2004 | Asbury |
| 2004/0138899 A1 | 7/2004 | Birnbaum et al. |
| 2004/0174397 A1 | 9/2004 | Cereghini et al. |
| 2004/0225651 A1 | 11/2004 | Musgrove et al. |
| 2004/0230989 A1 | 11/2004 | Macey et al. |
| 2004/0255232 A1 | 12/2004 | Hammond et al. |
| 2005/0027704 A1 | 2/2005 | Hammond et al. |
| 2005/0028156 A1 | 2/2005 | Hammond et al. |

(56) References Cited

U.S. PATENT DOCUMENTS

| | | |
|---|---|---|
| 2005/0033582 A1 | 2/2005 | Gadd et al. |
| 2005/0049852 A1 | 3/2005 | Chao |
| 2005/0125213 A1 | 6/2005 | Chen et al. |
| 2005/0137854 A1 | 6/2005 | Cancedda et al. |
| 2005/0273362 A1 | 12/2005 | Harris et al. |
| 2006/0031182 A1 | 2/2006 | Ryan et al. |
| 2006/0074634 A1 | 4/2006 | Gao et al. |
| 2006/0100852 A1* | 5/2006 | Gamon ............... G06F 40/30 704/9 |
| 2006/0101335 A1 | 5/2006 | Pisciottano |
| 2006/0181531 A1 | 8/2006 | Goldschmidt |
| 2006/0212446 A1 | 9/2006 | Hammond et al. |
| 2006/0218485 A1 | 9/2006 | Blumenthal |
| 2006/0224570 A1 | 10/2006 | Quiroga et al. |
| 2006/0241936 A1 | 10/2006 | Katae |
| 2006/0271535 A1 | 11/2006 | Hammond et al. |
| 2006/0277168 A1 | 12/2006 | Hammond et al. |
| 2007/0132767 A1 | 6/2007 | Wright et al. |
| 2007/0136657 A1 | 6/2007 | Blumenthal et al. |
| 2007/0185846 A1 | 8/2007 | Budzik et al. |
| 2007/0185847 A1 | 8/2007 | Budzik et al. |
| 2007/0185861 A1 | 8/2007 | Budzik et al. |
| 2007/0185862 A1 | 8/2007 | Budzik et al. |
| 2007/0185863 A1 | 8/2007 | Budzik et al. |
| 2007/0185864 A1 | 8/2007 | Budzik et al. |
| 2007/0185865 A1 | 8/2007 | Budzik et al. |
| 2007/0250479 A1 | 10/2007 | Lunt et al. |
| 2007/0250826 A1 | 10/2007 | O'Brien |
| 2007/0294201 A1 | 12/2007 | Nelken et al. |
| 2008/0005677 A1 | 1/2008 | Thompson |
| 2008/0140696 A1 | 6/2008 | Mathuria |
| 2008/0198156 A1 | 8/2008 | Jou et al. |
| 2008/0250070 A1 | 10/2008 | Abdulla et al. |
| 2008/0256066 A1 | 10/2008 | Zuckerman et al. |
| 2008/0304808 A1 | 12/2008 | Newell et al. |
| 2008/0306882 A1 | 12/2008 | Schiller |
| 2008/0313130 A1 | 12/2008 | Hammond et al. |
| 2009/0019013 A1 | 1/2009 | Tareen et al. |
| 2009/0030899 A1 | 1/2009 | Tareen et al. |
| 2009/0049041 A1 | 2/2009 | Tareen et al. |
| 2009/0083288 A1 | 3/2009 | LeDain et al. |
| 2009/0119584 A1 | 5/2009 | Herbst |
| 2009/0144608 A1 | 6/2009 | Oisel et al. |
| 2009/0144609 A1 | 6/2009 | Liang et al. |
| 2009/0157664 A1* | 6/2009 | Wen ....................... G06Q 50/14 |
| 2009/0175545 A1 | 7/2009 | Cancedda et al. |
| 2009/0248399 A1 | 10/2009 | Au |
| 2010/0146393 A1 | 6/2010 | Land et al. |
| 2010/0161541 A1 | 6/2010 | Covannon et al. |
| 2010/0185984 A1 | 7/2010 | Wright et al. |
| 2010/0241620 A1 | 9/2010 | Manister et al. |
| 2010/0325107 A1 | 12/2010 | Kenton et al. |
| 2011/0022941 A1 | 1/2011 | Osborne et al. |
| 2011/0040837 A1 | 2/2011 | Eden et al. |
| 2011/0044447 A1 | 2/2011 | Morris et al. |
| 2011/0077958 A1 | 3/2011 | Breitenstein et al. |
| 2011/0078105 A1 | 3/2011 | Wallace |
| 2011/0087486 A1 | 4/2011 | Schiller |
| 2011/0099184 A1 | 4/2011 | Symington |
| 2011/0113315 A1 | 5/2011 | Datha et al. |
| 2011/0113334 A1 | 5/2011 | Joy et al. |
| 2011/0213642 A1 | 9/2011 | Makar et al. |
| 2011/0246182 A1 | 10/2011 | Allen |
| 2011/0249953 A1 | 10/2011 | Suri et al. |
| 2011/0261049 A1 | 10/2011 | Cardno et al. |
| 2011/0288852 A1 | 11/2011 | Dymetman et al. |
| 2011/0295595 A1* | 12/2011 | Cao ....................... G06F 40/30 704/9 |
| 2011/0295903 A1 | 12/2011 | Chen |
| 2011/0307435 A1 | 12/2011 | Overell et al. |
| 2011/0311144 A1 | 12/2011 | Tardif |
| 2011/0314381 A1 | 12/2011 | Fuller et al. |
| 2012/0011428 A1 | 1/2012 | Chisholm |
| 2012/0041903 A1 | 2/2012 | Beilby et al. |
| 2012/0069131 A1 | 3/2012 | Abelow |
| 2012/0109637 A1 | 5/2012 | Merugu et al. |
| 2012/0143849 A1 | 6/2012 | Wong et al. |
| 2012/0158850 A1 | 6/2012 | Harrison et al. |
| 2012/0166180 A1 | 6/2012 | Au |
| 2012/0265531 A1 | 10/2012 | Bennett |
| 2012/0291007 A1* | 11/2012 | Bagheri ................. G06Q 10/10 717/106 |
| 2012/0310699 A1 | 12/2012 | McKenna et al. |
| 2013/0041677 A1 | 2/2013 | Nusimow et al. |
| 2013/0091031 A1 | 4/2013 | Baran et al. |
| 2013/0096947 A1 | 4/2013 | Shah et al. |
| 2013/0138430 A1 | 5/2013 | Eden et al. |
| 2013/0144605 A1 | 6/2013 | Brager et al. |
| 2013/0145242 A1 | 6/2013 | Birnbaum et al. |
| 2013/0173285 A1 | 7/2013 | Hyde et al. |
| 2013/0174026 A1 | 7/2013 | Locke |
| 2013/0185049 A1 | 7/2013 | Zhao et al. |
| 2013/0185051 A1* | 7/2013 | Buryak ................... G06F 40/58 704/2 |
| 2013/0187926 A1 | 7/2013 | Silverstein et al. |
| 2013/0211855 A1 | 8/2013 | Eberle et al. |
| 2013/0238316 A1* | 9/2013 | Shastri .................. G06F 40/10 704/9 |
| 2013/0238330 A1 | 9/2013 | Casella dos Santos |
| 2013/0246934 A1 | 9/2013 | Wade et al. |
| 2013/0253910 A1 | 9/2013 | Turner et al. |
| 2013/0262092 A1 | 10/2013 | Wasick |
| 2013/0275121 A1 | 10/2013 | Tunstall-Pedoe |
| 2013/0304507 A1 | 11/2013 | Dail et al. |
| 2013/0316834 A1 | 11/2013 | Vogel et al. |
| 2014/0006012 A1 | 1/2014 | Zhou et al. |
| 2014/0040312 A1 | 2/2014 | Gorman et al. |
| 2014/0062712 A1 | 3/2014 | Reiter |
| 2014/0075004 A1 | 3/2014 | Van Dusen et al. |
| 2014/0129942 A1 | 5/2014 | Rathod |
| 2014/0134590 A1 | 5/2014 | Hiscock, Jr. |
| 2014/0163962 A1 | 6/2014 | Castelli et al. |
| 2014/0200878 A1 | 7/2014 | Mylonakis et al. |
| 2014/0201202 A1 | 7/2014 | Jones et al. |
| 2014/0208215 A1 | 7/2014 | Deshpande |
| 2014/0314225 A1 | 10/2014 | Riahi et al. |
| 2014/0351281 A1 | 11/2014 | Tunstall-Pedoe |
| 2014/0356833 A1 | 12/2014 | Sabczynski et al. |
| 2014/0372850 A1 | 12/2014 | Campbell et al. |
| 2014/0375466 A1 | 12/2014 | Reiter |
| 2015/0032730 A1 | 1/2015 | Cialdea, Jr. et al. |
| 2015/0049951 A1 | 2/2015 | Chaturvedi et al. |
| 2015/0078232 A1 | 3/2015 | Djinki et al. |
| 2015/0134694 A1 | 5/2015 | Burke et al. |
| 2015/0142704 A1 | 5/2015 | London |
| 2015/0161997 A1 | 6/2015 | Wetsel et al. |
| 2015/0169548 A1 | 6/2015 | Reiter |
| 2015/0178386 A1 | 6/2015 | Oberkampf et al. |
| 2015/0186504 A1 | 7/2015 | Gorman et al. |
| 2015/0199339 A1 | 7/2015 | Mirkin et al. |
| 2015/0227508 A1 | 8/2015 | Howald et al. |
| 2015/0227588 A1 | 8/2015 | Shapira et al. |
| 2015/0242384 A1 | 8/2015 | Reiter |
| 2015/0261745 A1* | 9/2015 | Song ..................... G06F 40/56 704/9 |
| 2015/0268930 A1 | 9/2015 | Lee et al. |
| 2015/0286630 A1* | 10/2015 | Bateman ........... G06K 9/00483 704/9 |
| 2015/0324347 A1 | 11/2015 | Bradshaw et al. |
| 2015/0324351 A1 | 11/2015 | Sripada et al. |
| 2015/0324374 A1 | 11/2015 | Sripada et al. |
| 2015/0325000 A1 | 11/2015 | Sripada |
| 2015/0331846 A1 | 11/2015 | Guggilla et al. |
| 2015/0331850 A1 | 11/2015 | Ramish |
| 2015/0332665 A1 | 11/2015 | Mishra et al. |
| 2015/0339284 A1* | 11/2015 | Ban ....................... G06F 40/186 715/235 |
| 2015/0347391 A1* | 12/2015 | Chen ..................... H04L 51/046 704/9 |
| 2015/0347400 A1 | 12/2015 | Sripada |
| 2015/0347901 A1 | 12/2015 | Cama et al. |
| 2015/0356967 A1 | 12/2015 | Byron et al. |
| 2015/0363364 A1 | 12/2015 | Sripada |
| 2015/0370778 A1 | 12/2015 | Tremblay et al. |

(56) References Cited

U.S. PATENT DOCUMENTS

| | | |
|---|---|---|
| 2016/0019200 A1 | 1/2016 | Allen |
| 2016/0026253 A1 | 1/2016 | Bradski et al. |
| 2016/0027125 A1 | 1/2016 | Bryce |
| 2016/0054889 A1 | 2/2016 | Hadley et al. |
| 2016/0062954 A1 | 3/2016 | Ruff et al. |
| 2016/0103559 A1 | 4/2016 | Maheshwari et al. |
| 2016/0132489 A1 | 5/2016 | Reiter |
| 2016/0140090 A1 | 5/2016 | Dale et al. |
| 2016/0162582 A1 | 6/2016 | Chatterjee et al. |
| 2016/0196491 A1 | 7/2016 | Chandrasekaran et al. |
| 2016/0217133 A1 | 7/2016 | Reiter et al. |
| 2016/0232152 A1 | 8/2016 | Mahamood |
| 2016/0232221 A1 | 8/2016 | McCloskey et al. |
| 2016/0314121 A1 | 10/2016 | Arroyo et al. |
| 2016/0314123 A1 | 10/2016 | Ramachandran et al. |
| 2016/0379132 A1* | 12/2016 | Jin .................. H04L 67/22 706/12 |
| 2017/0004415 A1 | 1/2017 | Moretti et al. |
| 2017/0006135 A1 | 1/2017 | Siebel et al. |
| 2017/0017897 A1 | 1/2017 | Bugay et al. |
| 2017/0024465 A1 | 1/2017 | Yeh et al. |
| 2017/0026705 A1 | 1/2017 | Yeh et al. |
| 2017/0046016 A1 | 2/2017 | Riche et al. |
| 2017/0060857 A1 | 3/2017 | Imbruce et al. |
| 2017/0061093 A1 | 3/2017 | Amarasingham et al. |
| 2017/0068551 A1 | 3/2017 | Vadodaria |
| 2017/0091291 A1 | 3/2017 | Bostick et al. |
| 2017/0104785 A1* | 4/2017 | Stolfo .................. H04L 63/1491 |
| 2017/0116327 A1 | 4/2017 | Gorelick et al. |
| 2017/0124062 A1 | 5/2017 | Bhaowal et al. |
| 2017/0125015 A1* | 5/2017 | Dielmann .................. G10L 25/87 |
| 2017/0131975 A1* | 5/2017 | Balasubramanian ...... G06F 8/30 |
| 2017/0140405 A1 | 5/2017 | Gottemukkala et al. |
| 2017/0185674 A1 | 6/2017 | Tonkin et al. |
| 2017/0199928 A1 | 7/2017 | Zhao et al. |
| 2017/0206890 A1 | 7/2017 | Tapuhi et al. |
| 2017/0212671 A1 | 7/2017 | Sathish et al. |
| 2017/0213157 A1 | 7/2017 | Bugay et al. |
| 2017/0228372 A1 | 8/2017 | Moreno et al. |
| 2017/0228659 A1* | 8/2017 | Lin .................. G06N 3/08 |
| 2017/0242886 A1 | 8/2017 | Jolley et al. |
| 2017/0270105 A1 | 9/2017 | Ninan et al. |
| 2017/0293864 A1 | 10/2017 | Oh et al. |
| 2017/0358295 A1 | 12/2017 | Roux et al. |
| 2017/0371856 A1 | 12/2017 | Can et al. |
| 2018/0025726 A1 | 1/2018 | Gatti de Bayser et al. |
| 2018/0060759 A1* | 3/2018 | Chu .................. G06N 20/00 |
| 2018/0075368 A1 | 3/2018 | Brennan et al. |
| 2018/0081869 A1* | 3/2018 | Hager .................. G06F 16/31 |
| 2018/0082184 A1 | 3/2018 | Guo et al. |
| 2018/0089177 A1* | 3/2018 | Cho .................. G06F 40/58 |
| 2018/0114158 A1 | 4/2018 | Foubert et al. |
| 2018/0129721 A1* | 5/2018 | Apple .................. G06Q 10/06395 |
| 2018/0189284 A1 | 7/2018 | Hosabettu |
| 2018/0232443 A1 | 8/2018 | Delgo et al. |
| 2018/0232487 A1 | 8/2018 | Erard et al. |
| 2018/0232493 A1 | 8/2018 | Erard et al. |
| 2018/0232812 A1 | 8/2018 | Erard et al. |
| 2018/0234442 A1* | 8/2018 | Luo .................. H04L 63/14 |
| 2018/0260380 A1 | 9/2018 | Birnbaum et al. |
| 2018/0261203 A1 | 9/2018 | Zoller et al. |
| 2018/0285324 A1 | 10/2018 | Birnbaum et al. |
| 2018/0314689 A1 | 11/2018 | Wang et al. |
| 2018/0373999 A1* | 12/2018 | Xu .................. G06K 9/00765 |
| 2019/0042559 A1 | 2/2019 | Allen et al. |
| 2019/0102614 A1* | 4/2019 | Winder .................. G06F 40/30 |
| 2019/0121918 A1* | 4/2019 | Fort .................. G06F 16/90335 |
| 2019/0138615 A1 | 5/2019 | Huh et al. |
| 2019/0147849 A1* | 5/2019 | Talwar .................. G06F 40/56 704/258 |
| 2019/0197097 A1 | 6/2019 | Nagarajan et al. |
| 2019/0236140 A1 | 8/2019 | Canim et al. |
| 2019/0272827 A1 | 9/2019 | Vozila |
| 2019/0312968 A1* | 10/2019 | Moon .................. G06K 9/6215 |
| 2019/0332666 A1 | 10/2019 | Dadachev et al. |
| 2019/0347553 A1* | 11/2019 | Lo .................. G06N 3/082 |
| 2019/0370696 A1 | 12/2019 | Ezen Can et al. |
| 2020/0074013 A1 | 3/2020 | Chen et al. |
| 2020/0074310 A1 | 3/2020 | Li et al. |
| 2020/0074401 A1* | 3/2020 | Oliveira Almeida .. G06N 5/003 |
| 2020/0089735 A1 | 3/2020 | Birnbaum et al. |
| 2020/0110902 A1* | 4/2020 | Zakour .................. G06F 16/22 |
| 2020/0134032 A1 | 4/2020 | Lin et al. |
| 2020/0143468 A1 | 5/2020 | Riley |
| 2020/0151443 A1* | 5/2020 | Florencio .................. G06K 9/6256 |
| 2020/0202846 A1* | 6/2020 | Bapna .................. G06N 3/0481 |
| 2020/0302393 A1* | 9/2020 | Gupta .................. G06Q 10/10 |
| 2020/0379780 A1* | 12/2020 | Sutton .................. G06N 20/00 |

FOREIGN PATENT DOCUMENTS

| | | |
|---|---|---|
| WO | 2014035400 A1 | 3/2014 |
| WO | 2014035402 A1 | 3/2014 |
| WO | 2014035403 A1 | 3/2014 |
| WO | 2014035406 A1 | 3/2014 |
| WO | 2014035407 A1 | 3/2014 |
| WO | 2014035447 A1 | 3/2014 |
| WO | 2014070197 A1 | 5/2014 |
| WO | 2014076524 A1 | 5/2014 |
| WO | 2014076525 A1 | 5/2014 |
| WO | 2014102568 A1 | 7/2014 |
| WO | 2014102569 A1 | 7/2014 |
| WO | 2014111753 A1 | 7/2014 |
| WO | 2015028844 A1 | 3/2015 |
| WO | 2015159133 A1 | 10/2015 |

OTHER PUBLICATIONS

Andersen, P., Hayes, P., Huettner, A., Schmandt, L., Nirenburg, I., and Weinstein, S. (1992). Automatic extraction of facts from press releases to generate news stories. In Proceedings of the third conference on Applied natural language processing. (Trento, Italy). ACM Press, New York, NY, 170-177.

Andre, E., Herzog, G., & Rist, T. (1988). On the simultaneous interpretation of real world image sequences and their natural language description: the system SOCCER. Paper presented at Proceedings of the 8th. European Conference on Artificial Intelligence (ECAI), Munich.

Asset Economics, Inc. (Feb. 11, 2011).

Bailey, P. (1999). Searching for Storiness: Story-Generation from a Reader's Perspective. AAAI Technical Report FS-99-01.

Bethem, T., Burton, J., Caldwell, T., Evans, M., Kittredge, R., Lavoie, B., and Werner, J. (2005). Generation of Real-time Narrative Summaries for Real-time Water Levels and Meteorological Observations in PORTS®. In Proceedings of the Fourth Conference on Artificial Intelligence Applications to Environmental Sciences (AMS-2005), San Diego, California.

Bourbeau, L., Carcagno, D., Goldberg, E., Kittredge, R., & Polguere, A. (1990). Bilingual generation of weather forecasts in an operations environment. Paper presented at Proceedings of the 13th International Conference on Computational Linguistics (COLING), Helsinki, Finland, pp. 318-320.

Boyd, S. (1998). TREND: a system for generating intelligent descriptions of time series data. Paper presented at Proceedings of the IEEE international conference on intelligent processing systems (ICIPS-1998).

Character Writer Version 3.1, Typing Chimp Software LLC, 2012, screenshots from working program, pp. 1-19.

Dehn, N. (1981). Story generation after TALE-SPIN. In Proceedings of the Seventh International Joint Conference on Artificial Intelligence. (Vancouver, Canada).

Dramatica Pro version 4, Write Brothers, 1993-2006, user manual.

Gatt, A., and Portet, F. (2009). Text content and task performance in the evaluation of a Natural Language Generation System. Proceedings of the Conference on Recent Advances in Natural Language Processing (RANLP-09).

(56) References Cited

OTHER PUBLICATIONS

Gatt, A., Portet, F., Reiter, E., Hunter, J., Mahamood, S., Moncur, W., and Sripada, S. (2009). From data to text in the Neonatal Intensive Care Unit: Using NLG technology for decision support and information management. AI Communications 22, pp. 153-186.
Glahn, H. (1970). Computer-produced worded forecasts. Bulletin of the American Meteorological Society, 51(12), 1126-1131.
Goldberg, E., Driedger, N., & Kittredge, R. (1994). Using Natural-Language Processing to Produce Weather Forecasts. IEEE Expert, 9 (2), 45.
Hargood, C., Millard, D. and Weal, M. (2009) Exploring the Importance of Themes in Narrative Systems.
Hargood, C., Millard, D. and Weal, M. (2009). Investigating a Thematic Approach to Narrative Generation, 2009.
Hunter, J., Freer, Y., Gatt, A., Logie, R., McIntosh, N., van der Meulen, M., Portet, F., Reiter, E., Sripada, S., and Sykes, C. (2008). Summarising Complex ICU Data in Natural Language. AMIA 2008 Annual Symposium Proceedings, pp. 323-327.
Hunter, J., Gatt, A., Portet, F., Reiter, E., and Sripada, S. (2008). Using natural language generation technology to improve information flows in intensive care units. Proceedings of the 5th Conference on Prestigious Applications of Intelligent Systems, PAIS-08.
Kittredge, R., and Lavoie, B. (1998). MeteoCogent: A Knowledge-Based Tool for Generating Weather Forecast Texts. In Proceedings of the American Meteorological Society AI Conference (AMS-98), Phoenix, Arizona.
Kittredge, R., Polguere, A., & Goldberg, E. (1986). Synthesizing weather reports from formatted data. Paper presented at Proceedings of the 11th International Conference on Computational Linguistics, Bonn, Germany, pp. 563-565.
Kukich, K. (1983). Design of a Knowledge-Based Report Generator. Proceedings of the 21st Conference of the Association for Computational Linguistics, Cambridge, MA, pp. 145-150.
Kukich, K. (1983). Knowledge-Based Report Generation: A Technique for Automatically Generating Natural Language Reports from Databases. Paper presented at Proceedings of the Sixth International ACM SIGIR Conference, Washington, DC.
McKeown, K., Kukich, K., & Shaw, J. (1994). Practical issues in automatic documentation generation. 4th Conference on Applied Natural Language Processing, Stuttgart, Germany, pp. 7-14.
Meehan, James R., TALE-SPIN. (1977). An Interactive Program that Writes Stories. In Proceedings of the Fifth International Joint Conference on Artificial Intelligence.
Memorandum Opinion and Order for *O2 Media, LLC v. Narrative Science Inc.*, Case 1:15-cv-05129 (N.D. IL), Feb. 25, 2016, 25 pages (invalidating claims of U.S. Pat. No. 7,856,390, U.S. Pat. No. 8,494,944, and U.S. Pat. No. 8,676,691 owned by O2 Media, LLC.
Moncur, W., and Reiter, E. (2007). How Much to Tell? Disseminating Affective Information across a Social Network. Proceedings of Second International Workshop on Personalisation for e-Health.
Moncur, W., Masthoff, J., Reiter, E. (2008) What Do You Want to Know? Investigating the Information Requirements of Patient Supporters. 21st IEEE International Symposium on Computer-Based Medical Systems (CBMS 2008), pp. 443-448.
Movie Magic Screenwriter, Write Brothers, 2009, user manual.
Portet, F., Reiter, E., Gatt, A., Hunter, J., Sripada, S., Freer, Y., and Sykes, C. (2009). Automatic Generation of Textual Summaries from Neonatal Intensive Care Data. Artificial Intelligence.
Portet, F., Reiter, E., Hunter, J., and Sripada, S. (2007). Automatic Generation of Textual Summaries from Neonatal Intensive Care Data. In: Bellazzi, Riccardo, Ameen Abu-Hanna and Jim Hunter (Ed.), 11th Conference on Artificial Intelligence in Medicine (AIME 07), pp. 227-236.
Reiter et al., "Building Applied Natural Generation Systems", Cambridge University Press, 1995, pp. 1-32.
Reiter, E. (2007). An architecture for Data-To-Text systems. In: Busemann, Stephan (Ed.), Proceedings of the 11th European Workshop on Natural Language Generation, pp. 97-104.

Reiter, E., Gatt, A., Portet, F., and van der Meulen, M. (2008). The importance of narrative and other lessons from an evaluation of an NLG system that summarises clinical data. Proceedings of the 5th International Conference on Natural Language Generation.
Reiter, E., Sripada, S., Hunter, J., Yu, J., and Davy, I. (2005). Choosing words in computer-generated weather forecasts. Artificial Intelligence, 167:137-169.
Riedl et al., "Narrative Planning: Balancing Plot and Character", Journal of Artificial Intelligence Research, 2010, pp. 217-268, vol. 39.
Robin, J. (1996). Evaluating the portability of revision rules for incremental summary generation. Paper presented at Proceedings of the 34th. Annual Meeting of the Association for Computational Linguistics (ACL'96), Santa Cruz, CA.
Rui, Y., Gupta, A., and Acero, A. 2000. Automatically extracting highlights for TV Baseball programs. In Proceedings of the eighth ACM international conference on Multimedia. (Marina del Rey, California, United States). ACM Press, New York, NY 105-115.
Sripada, S., Reiter, E., and Davy, I. (2003). SumTime-Mousam: Configurable Marine Weather Forecast Generator. Expert Update 6(3):4-10.
Storyview, Screenplay Systems, 2000, user manual.
Theune, M., Klabbers, E., Odijk, J., dePijper, J., and Krahmer, E. (2001) "From Data to Speech: A General Approach", Natural Language Engineering 7(1): 47-86.
Thomas, K., and Sripada, S. (2007). Atlas.txt: Linking Geo-referenced Data to Text for NLG. Paper presented at Proceedings of the 2007 European Natural Language Generation Workshop (ENLGO7).
Thomas, K., and Sripada, S. (2008). What's in a message? Interpreting Geo-referenced Data for the Visually-impaired. Proceedings of the Int. conference on NLG.
Thomas, K., Sumegi, L., Ferres, L., and Sripada, S. (2008). Enabling Access to Geo-referenced Information: Atlas.txt. Proceedings of the Cross-disciplinary Conference on Web Accessibility.
Van der Meulen, M., Logie, R., Freer, Y., Sykes, C., McIntosh, N., and Hunter, J. (2008). When a Graph is Poorer than 100 Words: A Comparison of Computerised Natural Language Generation, Human Generated Descriptions and Graphical Displays in Neonatal Intensive Care. Applied Cognitive Psychology.
Yu, J., Reiter, E., Hunter, J., and Mellish, C. (2007). Choosing the content of textual summaries of large time-series data sets. Natural Language Engineering, 13:25-49.
Yu, J., Reiter, E., Hunter, J., and Sripada, S. (2003). SUMTIME-TURBINE: A Knowledge-Based System to Communicate Time Series Data in the Gas Turbine Domain. In P Chung et al. (Eds) Developments in Applied Artificial Intelligence: Proceedings of IEA/AIE-2003, pp. 379-384. Springer (LNAI 2718).
Riedl et al., "From Linear Story Generation to Branching Story Graphs", IEEE Computer Graphics and Applications, 2006, pp. 23-31.
EnglisheForums, "Direct Objects, Indirect Objects, Obliques, Dative Movement?", [online] https://www.englishforums.com, published 2007. (Year: 2007).
Mack et al., "A Framework for Metrics in Large Complex Systems", IEEE Aerospace Conference Proceedings, 2004, pp. 3217-3228, vol. 5, doi: 10.1109/AERO .2004.1368127.
Mahamood et al., "Generating Annotated Graphs Using the NLG Pipeline Architecture", Proceedings of the 8th International Natural Language Generation Conference (INLG), 2014.
Office Action for U.S. Appl. No. 16/444,689 dated Feb. 5, 2021.
Prosecution History for U.S. Appl. No. 16/444,649, now U.S. Pat. No. 10,706,236, filed Jun. 18, 2019.
Roberts et al., "Lessons on Using Computationally Generated Influence for Shaping Narrative Experiences", IEEE Transactions on Computational Intelligence and AI in Games, Jun. 2014, pp. 188-202, vol. 6, No. 2, doi: 10.1109/TCIAIG .2013.2287154.
Segel et al., "Narrative Visualization: Telling Stories with Data", Stanford University, Oct. 2010, 10 pgs.
Cyganiak et al., "RDF 1.1 Concepts and Abstract Syntax", W3C Recommendation, 2014, vol. 25, No. 2.
Smith, "The Multivariable Method in Singular Perturbation Analysis", SIAM Review, 1975, pp. 221-273, vol. 17, No. 2.

(56) References Cited

OTHER PUBLICATIONS

Notice of Allowance for U.S. Appl. No. 15/666,168 dated Jun. 14, 2021.
Notice of Allowance for U.S. Appl. No. 16/235,649 dated Jun. 25, 2021.
Notice of Allowance for U.S. Appl. No. 16/235,696 dated Jul. 21, 2021.
Notice of Allowance for U.S. Appl. No. 16/235,636 dated Apr. 30, 2021.
Notice of Allowance for U.S. Appl. No. 16/277,006 dated Feb. 18, 2021.
Office Action for U.S. Appl. No. 15/414,027 dated Jan. 21, 2021.
Office Action for U.S. Appl. No. 15/414,089 dated Jan. 21, 2021.
Office Action for U.S. Appl. No. 15/666,168 dated Nov. 13, 2020.
Office Action for U.S. Appl. No. 15/666,151 dated Jun. 10, 2021.
Office Action for U.S. Appl. No. 16/183,270 dated Apr. 13, 2021.
Office Action for U.S. Appl. No. 16/253,556 dated Jun. 14, 2021.
Office Action for U.S. Appl. No. 16/277,004 dated Jun. 24, 2021.
Office Action for U.S. Appl. No. 16/744,537 dated Aug. 3, 2021.
Prosecution History for U.S. Appl. No. 15/897,331, now U.S. Pat. No. 10,762,304, filed Feb. 15, 2018.
Prosecution History for U.S. Appl. No. 16/444,748, now U.S. Pat. No. 11,042,713, filed Jun. 18, 2019.
Prosecution History for U.S. Appl. No. 16/689,699, now U.S. Pat. No. 10,956,656, filed Nov. 20, 2019.
Response to Office Action for U.S. Appl. No. 16/277,003, filed Mar. 15, 2021.
Response to Office Action for U.S. Appl. No. 16/277,004 dated Sep. 2, 2020.

\* cited by examiner

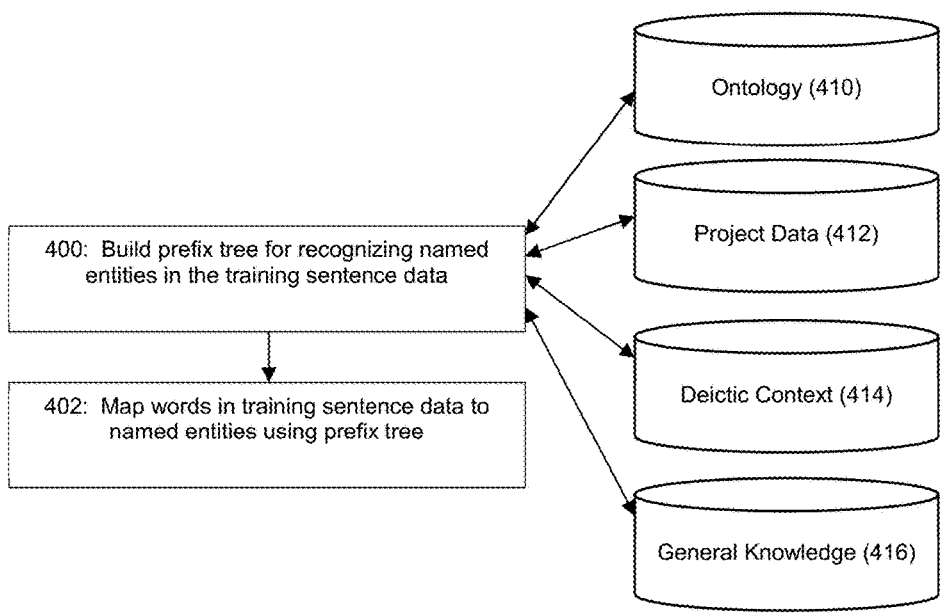

Figure 4A

```
{
    "aaron": { "young": {"_values_": EntityInstance(Aaron Young)}},
    "generate": {"_value_": Attribute(sales value)},
    "he": {"_value_": EntityInstance(Aaron Young)},
    "sales": {
        "goal": {"_values_": Attribute(sales goal)},
        "value": {"_values_": Attribute(sales value)},
    },
    "salesperson": {"_values_": EntityType(salesperson)},
    "salespeople": {"_values_": EntityType(salesperson)},
    "highest": {"_values_": Qualifier(Top Ranked)},
}
```

Figure 4B

"Aaron Young, whose sales increased by $7,000 this quarter, is based in Cincinnati" →

Aaron Young, whose sales increased by $7,000 this quarter, is based in Cincinnati →

"whose sales increased by $7,000 this quarter"

"Aaron Young, who was recently promoted, has more sales this month than last month" →

"Aaron Young, who was recently promoted, has more sales this month than last month" →

"Aaron Young has more sales this month than last month"

```
{
  "decimal_precision": [
    {
      "count": 2,
      "precision": 5,
      "original_sentences": [
        "The average bitcoin transaction in 2018 was 0.02339.",
        "The average ethereum transaction in 2018 was 0.01295."
      ]
    }
  ]
}
```

Figure 9A

```
{
  "decimal_separator": [
    {
      "count": 2,
      "separator": ".",
      "original_sentences": [
        "The average bitcoin transaction in 2018 was 0.02339.",
        "The average ethereum transaction in 2018 was 0.01295."
      ]
    }
  ]
}
```

Figure 9B

```
{
  "digit_grouping_delimiter": [
    {
      "count": 3,
      "separator": ",",
      "original_sentences": [
        "There were a total of 3,620,532,918 bitcoin transactions in 2018.",
        "There were a total of 923,255,751 ethereum transactions in 2018.",
        "There were a total of 212,433,230 dogecoin transactions in 2018.",
      ]
    }
  ]
}
```

Figure 9C

```
{
  "currency_symbol": [
    {
      "count": 2,
      "symbol": "$",
      "original_sentences": [
        "The overall market value of bitcoins in circulation is $166,450,000,000",
        "The overall market value of ethereum in circulation is $3,922,000,000",
      ]
    }
  ]
}
```

Figure 9D

```
{
  "day_expression": [
    {
      "count": 3,
      "format_str": "MMMM D, YYYY",
      "strftime": "%B %d, %Y",
      "original_sentences": [
        "The first exchange of bitcoin occurred on January 13, 2015."
        "Bitcoin reached its highest value on February 11, 2018.",
        "Bitcoin shed almost 55% of its value on February 20, 2018."
      ]
    }
  ]
}
```

Figure 9E

```
{
  "month_expression": [
    {
      "count": 1,
      "format_str": "MMMM YYYY",
      "strftime": "%B %Y",
      "original_sentences": [
        "The highest volume of bitcoin trading occurred in February 2018."
      ]
    }
  ]
}
```

Figure 9F

```
{
  "currency_expression": [
    "count": 2,
    "parameters": {
      "use_symbol": true,
      "use_words": true,
      "use_abbreviation": true,
      "symbol_after_value": false,
      "words_before_value": false,
    },
    "original_sentences": [
      "The overall market value of bitcoins in circulation is $166,450,000,000 USD.",
      "The overall market value of ethereum in circulation is $3,922,000,000 USD.",
    ]
  ]
}
```

Figure 9G

```
{
  "numeric_expression": [
    "count": 2,
    "format": {
      "range": [1000000, 1000000000000]
      "use_words": true,
      "use_abbreviations": true,
      "precision": 1
    },
    "original_sentences": [
      "The total number of bitcoins in circulation is 10.3B.",
      "The total number of ethereum in circulation is 8.2B.",
    ]
  ]
}
```

Figure 9H

```
{
  "vocabulary": [
    {
      "count": 2,
      "expression": "yield",
      "object_id": "8af8090b-f06a-4b84-851a-200b78f74482",
      "object_label": "region.sales",
      "object_type": "attribute",
      "original_sentences": [
        "It yielded much higher profits than last year's best region (Sweden)",
        "It yielded much lower profits than last year's worst region (Greece)"
      ]
    }
  ]
}
```

Figure 9I

```
{
  "concept_expression": [
    {
      "count": 1,
      "concept": "change",
      "matched_phrases": [ "experienced the biggest drop in profit" ],
      "matched_tokens": [ "drop" ],
      "original_parses": [
        ["... (ASCII representation of original parse tree) ..."]
      ],
      "original_sentences": [
        "The segments that experienced the biggest drop in profit were Carbonated Beverages and Foodservice Suppliers to increased general operating expenses, as well as industrial Equipment Leasing due to increased net losses incurred."
      ],
      "parameters": [
        {
          "ATTR_0": [
            "profit",
            [8]
          ],
          "ENTITY_0": [
            "",
            []
          ],
          "TARGET_0": [
            "drop",
            [6]
          ]
        }
      ],
      "pretty_template": "...(UI-friendly parse tree)...",
      "spec": [
        "ENTITY_0",
        "ATTR_0"
      ],
      "target_modifiers": [
        {
          "TARGET_0": [
            ["the", "DT"],
            ["biggest","JJS"]
          ]
        }
      ],
      "template": "(ROOT\n(S\n  (NP (*NN ENTITY_0))\n  (VP\n    (VB experience)\n    (NP (NP (NN TARGET_0)) (PP (IN in) (NP (*NN ATTR_0)))))))\n"
    }
  ]
}
```

```
{
  "vocabulary": [
    {
      "count": 3,
      "expression": "income",
      "object_id": "669bdb3e-b402-4503-862a-834e2d184f9b",
      "object_label": "region.income",
      "object_type": "attribute",
      "original_sentences": [
        "The United States was the top region by income this year",
        "In fact, it exceeded the total income of the bottom 10 regions combined",
        "Roughly half of the segments in the region saw their income fall"
      ]
    },
    {
      "count": 2,
      "expression": "yield",
      "object_id": "8af8090b-f06a-4b84-851a-200b78f74482",
      "object_label": "region.sales",
      "object_type": "attribute",
      "original_sentences": [
        "It yielded much higher profits than last year's best region (Sweden)",
        "It yielded much higher profits than last year's best region (Sweden)"
      ]
    }
  ]
}
```

Figure 11A

```
{
  "vocabulary": [
    {
      "enabled": false
    },
    {
      "enabled': true
    }
  ]
}
```

Figure 11B

```
curl -X POST \
  -F 'file1=@/Users/msmathers/Desktop/wlm_files/files.zip'\
  -F 'file2=@/Users/msmathers/Desktop/wlm_files/file3.txt'\
  -F 'file3=@/Users/msmathers/Desktop/wlm_files/file4.txt'\
  'http://localhost:9999/wlm/v1/spec/?project_id=<project-id123>'\
  > /Users/msmathers/Desktop/spec.json
```

Figure 12A

```
curl -X PUT \
  -H 'Content-type: application/json'\
  --data "@/Users/msmathers/Desktop/spec.json"\
  'http://localhost:9999/wlm/v1/applicators/nlg-platform/?project_id=<project-id123>'
```

Figure 12B

APPLIED ARTIFICIAL INTELLIGENCE TECHNOLOGY FOR USING NATURAL LANGUAGE PROCESSING TO TRAIN A NATURAL LANGUAGE GENERATION SYSTEM WITH RESPECT TO DATE AND NUMBER TEXTUAL FEATURES

CROSS-REFERENCE AND PRIORITY CLAIM TO RELATED PATENT APPLICATIONS

This patent application claims priority to U.S. provisional patent application Ser. No. 62/691,197, filed Jun. 28, 2018, and entitled "Applied Artificial Intelligence Technology for Using Natural Language Processing to Train a Natural Language Generation System", the entire disclosure of which is incorporated herein by reference.

This patent application is related to (1) U.S. patent application Ser. No. 16/444,649, filed this same day, and entitled "Applied Artificial Intelligence Technology for Using Natural Language Processing and Concept Expression Templates to Train a Natural Language Generation System", (2) U.S. patent application Ser. No. 16/444,689, filed this same day, and entitled "Applied Artificial Intelligence Technology for Using Natural Language Processing to Train a Natural Language Generation System With Respect to Numeric Style Features", and (3) U.S. patent application Ser. No. 16/444,748, filed this same day, and entitled "Applied Artificial Intelligence Technology for Using Natural Language Processing to Train a Natural Language Generation System", the entire disclosures of each of which are incorporated herein by reference.

INTRODUCTION

There is an ever-growing need in the art for improved natural language generation (NLG) technology. However, one of the challenges for developing a robust NLG system as a platform that is to be used by many different users is that each user may have different stylistic preferences regarding how content should be presented in NLG output. For example, Company A and Company B may both use the same underlying NLG technology to produce performance reports about its salespeople, but each may have different stylistic preferences for such reports. However, configuring the NLG system to differentiate its stylistic output for different users is a challenging task technologically.

As a technical advance in the art, the inventors disclose the use of natural language processing (NLP) techniques that are applied to training data to generate information used to train an NLG system to produce output that stylistically resembles the training data. In other words, the NLP techniques discussed herein permit an NLG system to be trained via automated learning techniques in a manner that will satisfy a user who wants the NLG system to "write like me".

NLG is a subfield of artificial intelligence (AI) concerned with technology that produces language as output on the basis of some input information or structure (e.g., where the input constitutes data about a situation to be analyzed and expressed in natural language).

NLP is a subfield of AI concerned with technology that interprets natural language inputs, and natural language understanding (NLU) is a subfield of NLP concerned with technology that draws conclusions on the basis of some input information or structure.

A computer system that trains an NLG system to flexibly produce style-specific natural language outputs needs to combine these difficult areas of NLG and NLP/NLU so that the system not only understands the deeper meanings and styles that underlie the training data but also is able to translate these stylistic understandings and meanings into a configuration that is usable by the NLG system. The inventors disclose herein a number of technical advances with respect to the use of NLP technology to train an NLG system.

For example, the inventors disclose an NLP system that is able to detect a plurality of linguistic features in the training data, wherein the training data comprises a plurality of words arranged in a natural language. These detected linguistic features are then aggregated into a specification data structure that is arranged for training an NLG system to produce natural language output that stylistically resembles the training data. This specification data structure can comprise a machine-readable representation of the detected linguistic features. Parameters in the specification data structure can be linked to objects in an ontology used by the NLG system to facilitate the training of the NLG system based on the detected linguistic features.

The detected linguistic features can include numeric styles in the training data as well as date and number textual expressions in the training data. Examples of such linguistic features include decimal precision features, decimal separator features, digit grouping delimiter features, currency symbol features, day expressions features, month expression features, currency expressions features, and numeric expressions features.

The detected linguistic features can also include ontological vocabulary derived from the training data. Such ontological vocabulary can be used to train the NLG system to use expressions for ontological objects known by the NLG system that match up with how those ontological objects are expressed in the training data.

In a particularly powerful example embodiment discussed herein, the detected linguistic features can include concept expression templates that model how a concept is expressed in the training data. Examples of concepts that can be modeled in this fashion from the training data include change concepts, compare concepts, driver concepts, and rank concepts. In an example embodiment, to detect and extract such concept expression templates from the training data, the training data can be scanned for the presence of one or more anchor words, where each anchor word is associated with a concept understood by the system. If an anchor word is present in the training data, the system can then process the training data to extract an expression template that models how the concept associated with the present anchor word is discussed in the training data. NLP parsing can be applied to the training data and linkages to NLG ontologies can be employed to facilitate this concept expression template extraction.

Further still, the inventors disclose how user interfaces can be employed that permit a user to selectively control which of the detected linguistic features will be used to train the NLG system. Such user interfaces can also permit users to create concept expression templates "on the fly" in response to text inputs from the user (e.g., where a user types in a sentence from which a concept expression template is to be extracted).

Through these and other features, example embodiments of the invention provide significant technical advances in the NLP and NLG arts by harnessing computer technology to improve how natural language training data is processed to train an NLG system for producing natural language outputs in a manner that stylistically resembles the training data.

BRIEF DESCRIPTION OF THE DRAWINGS

FIG. 4A discloses an example process flow for entity identification in support of NLP in accordance with an example embodiment.

FIG. 4B discloses an example prefix tree that can be used for identifying entities in training data.

FIGS. 9A-9J show examples of different portions of a specification data structure that can be produced by the NLP training system.

FIG. 10H shows an example narrative produced by the trained NLG system.

FIGS. 11A and 11B show example specification data structures that illustrate how user inputs via user interfaces can modify a base specification data structure.

FIGS. 12A and 12B show example commands for an HTTP API with respect to an example embodiment.

DETAILED DESCRIPTION OF EXAMPLE EMBODIMENTS

Figure 1:
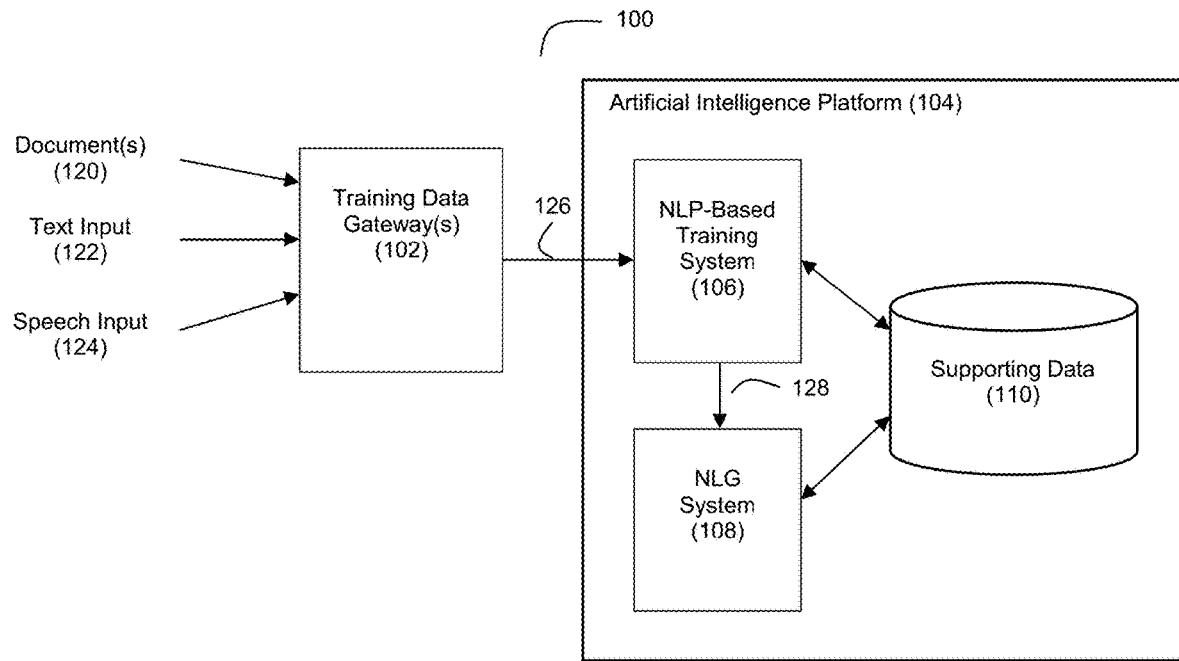
FIG. 1 discloses an example AI computer system in accordance with an example embodiment.

FIG. 1 shows an example computer system 100 in accordance with an example embodiment. The computer system 100 may comprise a training data gateway 102 that links an artificial intelligence (AI) platform 104 with one or more sources of input training data such as document(s) 120, text input 122, and/or speech input 124. The training data gateway 102 then provides such information to an NLP-based training system 106 as training data 126. As an example, the training data gateway 102 can receive an upload of one or more documents 120, where the document(s) 120 serve as training data 126. The training data gateway 102 can also receive user input in the form of text 122 (such as text input through a graphical user interface) wherein the text 122 serves as training data 126. The training data gateway 102 can also receive user input in the form of speech 124, where speech recognition is performed by the gateway 102 to convert the speech into training data 126. For example, software such as the Transcribe application available from Amazon could be employed to transcribe speech data into text data for processing. The document(s) 120, text input 122, and/or speech input 124 can take the form of unstructured data arranged as a plurality of words in a natural language format. The NLP-based training system 106 applies NLP to the training data to determine linguistic styles that are present in the training data and uses the determined linguistic styles to generate configuration data 128 that is used to train the NLG system 108 to produce natural language output that stylistically resembles the training data 126.

To aid the NLP-based training system 106 and the NLG system 108 in their operations, the NLP-based training system 106 and the NLG system 108 can access supporting data 110. This supporting data 110 can include the ontological and project data that serves as a knowledge base for the AI platform 104.

The computer system 100 comprises one or more processors and associated memories that cooperate together to implement the operations discussed herein. The computer system 100 may also include a data source that serves as a repository of data for analysis by the AI platform 104 when processing inputs and generating outputs. These components can interconnect with each other in any of a variety of manners (e.g., via a bus, via a network, etc.). For example, the computer system 100 can take the form of a distributed computing architecture where one or more processors implement the NLP tasks described herein (see NLP-based training system 106), one or more processors implement the NLG tasks described herein (see NLG system 108). Furthermore, different processors can be used for NLP and NLG tasks, or alternatively some or all of these processors may implement both NLP and NLG tasks. It should also be understood that the computer system 100 may include additional or different components if desired by a practitioner. The one or more processors may comprise general-purpose processors (e.g., a single-core or multi-core microprocessor), special-purpose processors (e.g., an application-specific integrated circuit or digital-signal processor), programmable-logic devices (e.g., a field programmable gate array), etc. or any combination thereof that are suitable for carrying out the operations described herein. The associated memories may comprise one or more non-transitory computer-readable storage mediums, such as volatile storage mediums (e.g., random access memory, registers, and/or cache) and/or non-volatile storage mediums (e.g., read-only memory, a hard-disk drive, a solid-state drive, flash memory, and/or an optical-storage device). The memory may also be integrated in whole or in part with other components of the system 100. Further, the memory may be local to the processor(s), although it should be understood that the memory (or portions of the memory) could be remote from the processor(s), in which case the processor(s) may access such remote memory through a network interface. The memory may store software programs or instructions that are executed by the processor(s) during operation of the system 100. Such software programs can take the form of a plurality of instructions configured for execution by processor(s). The memory may also store project or session data generated and used by the system 100. The data source can be any source of data, such as one or more databases, file systems, computer networks, etc. which may be part of the memory accessed by the processor(s).

The NLP-based training system 106 can be designed to work end-to-end without any human supervision, although it should be understood that a practitioner may choose to provide a user interface that allows users to review and update the determined linguistic features before they are applied to the NLG system 108.

Figure 2:
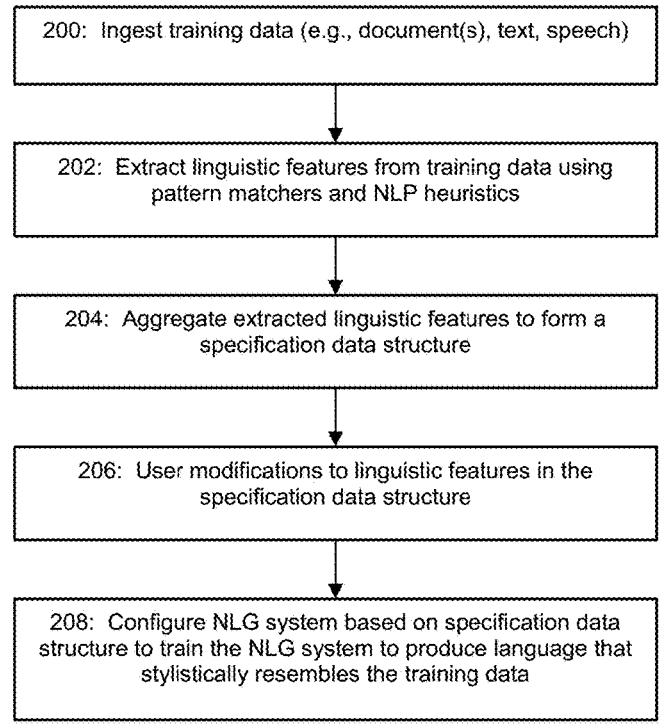
FIG. 2 discloses an example process flow for NLP-based training of an NLG system.

FIG. 2 depicts an example process flow for execution by one or more processors that implement the NLP-based training system 106. At step 200, a processor ingests the training data 126. For example, as noted, the training data 126 can take the form of a corpus of documents that are represented by files. The documents can be ingested, converted into raw text strings, and saved for use by the training system 106 (for example, in a relational database as one document per row). The same process can be followed for text inputs and speech inputs, albeit the volume of data will likely be lower in such instances. Also, if desired, multiple files can be ingested at step 200 using techniques such as multi-part, form-encoded HTTP POST.

At step 202, a processor extracts linguistic features from the ingested training data using a variety of pattern matchers and rule-based NLP heuristics, examples of which are discussed below. Using these techniques, specific linguistic features can be detected in and extracted from each document, and each document can be converted into a data structure (e.g., a JSON data structure) that contains linguistic feature metadata.

At step 204, a processor aggregates the extracted linguistic features produced from the documents at step 202 by iterating over the document-specific data structures. This can include deriving totals, percentages, grouping, and sorting, which operates to produce a specification data structure (e.g., a JSON specification data structure, which is a machine-readable description of the linguistic features extracted from the ingested training data 126.

At step 206, a user interface (e.g., a browser-based graphical user interface (GUI)) can process the specification data structure and present a user with the linguistic features discovered by steps 202 and 204. Through the user interface, the user can elect to discard any of the discovered linguistic features. In example embodiments, the user can also enter custom sentences into the user interface to add additional ontological vocabulary to the system and/or add concept expressions to the specification. However, as noted above, such user interaction can be omitted if desired by a practitioner.

At step 208, a processor configures the NLG system 108 based on the specification data structure to thereby train the NLG system 108 to produce language that stylistically resembles the training data 126. In an example embodiment, a platform-specific applicator can take the JSON specification data structure (and any user preferences) as inputs and update the appropriate configuration within the NLG system 108.

The NLG system 108 can then use the specification data structure to update its configuration information to control how it produces natural language output. In an example embodiment, the NLG system 108 can produce NLG output about a data set based on defined configurations such as parameterized communication goal statements. An example of NLG technology that can be used as the NLG system 108 is the QUILL™ narrative generation platform from Narrative Science Inc. of Chicago, Ill. Aspects of this technology are described in the following patents and patent applications: U.S. Pat. Nos. 8,374,848, 8,355,903, 8,630,844, 8,688,434, 8,775,161, 8,843,363, 8,886,520, 8,892,417, 9,208,147, 9,251,134, 9,396,168, 9,576,009, 9,697,178, 9,697,197, 9,697,492, 9,720,884, 9,720,899, and 9,977,773, 9,990,337, and 10,185,477; and U.S. patent application Ser. No. 15/253,385 (entitled "Applied Artificial Intelligence Technology for Using Narrative Analytics to Automatically Generate Narratives from Visualization Data, filed Aug. 31, 2016), 62/382,063 (entitled "Applied Artificial Intelligence Technology for Interactively Using Narrative Analytics to Focus and Control Visualizations of Data", filed Aug. 31, 2016), Ser. No. 15/666,151 (entitled "Applied Artificial Intelligence Technology for Interactively Using Narrative Analytics to Focus and Control Visualizations of Data", filed Aug. 1, 2017), Ser. No. 15/666,168 (entitled "Applied Artificial Intelligence Technology for Evaluating Drivers of Data Presented in Visualizations", filed Aug. 1, 2017), Ser. No. 15/666,192 (entitled "Applied Artificial Intelligence Technology for Selective Control over Narrative Generation from Visualizations of Data", filed Aug. 1, 2017), 62/458,460 (entitled "Interactive and Conversational Data Exploration", filed Feb. 13, 2017), Ser. No. 15/895,800 (entitled "Interactive and Conversational Data Exploration", filed Feb. 13, 2018), 62/460,349 (entitled "Applied Artificial Intelligence Technology for Performing Natural Language Generation (NLG) Using Composable Communication Goals and Ontologies to Generate Narrative Stories", filed Feb. 17, 2017), Ser. No. 15/897,331 (entitled "Applied Artificial Intelligence Technology for Performing Natural Language Generation (NLG) Using Composable Communication Goals and Ontologies to Generate Narrative Stories", filed Feb. 15, 2018), Ser. No. 15/897,350 (entitled "Applied Artificial Intelligence Technology for Determining and Mapping Data Requirements for Narrative Stories to Support Natural Language Generation (NLG) Using Composable Communication Goals", filed Feb. 15, 2018), Ser. No. 15/897,359 (entitled "Applied Artificial Intelligence Technology for Story Outline Formation Using Composable Communication Goals to Support Natural Language Generation (NLG)", filed Feb. 15, 2018), Ser. No. 15/897,364 (entitled "Applied Artificial Intelligence Technology for Runtime Computation of Story Outlines to Support Natural Language Generation (NLG)", filed Feb. 15, 2018), Ser. No. 15/897,373 (entitled "Applied Artificial Intelligence Technology for Ontology Building to Support Natural Language Generation (NLG) Using Composable Communication Goals", filed Feb. 15, 2018), Ser. No. 15/897,381 (entitled "Applied Artificial Intelligence Technology for Interactive Story Editing to Support Natural Language Generation (NLG)", filed Feb. 15, 2018), 62/539,832 (entitled "Applied Artificial Intelligence Technology for Narrative Generation Based on Analysis Communication Goals", filed Aug. 1, 2017), Ser. No. 16/047,800 (entitled "Applied Artificial Intelligence Technology for Narrative Generation Based on Analysis Communication Goals", filed Jul. 27, 2018), Ser. No. 16/047,837 (entitled "Applied Artificial Intelligence Technology for Narrative Generation Based on a Conditional Outcome Framework", filed Jul. 27, 2018), 62/585,809 (entitled "Applied Artificial Intelligence Technology for Narrative Generation Based on Smart Attributes and Explanation Communication Goals", filed Nov. 14, 2017), Ser. No. 16/183,230 (entitled "Applied Artificial Intelligence Technology for Narrative Generation Based on Smart Attributes", filed Nov. 7, 2018), Ser. No. 16/183,270 (entitled "Applied Artificial Intelligence Technology for Narrative Generation Based on Explanation Communication Goals", filed Nov. 7, 2018), 62/632,017 (entitled "Applied Artificial Intelligence Technology for Conversational Inferencing and Interactive Natural Language Generation", filed Feb. 19, 2018), Ser. No. 16/277,000 (entitled "Applied Artificial Intelligence Technology for Conversational Inferencing", filed Feb. 15, 2019), Ser. No. 16/277,003 (entitled "Applied Artificial Intelligence Technology for Conversational Inferencing and Interactive Natural Language Generation", filed Feb. 15, 2019), Ser. No. 16/277,004 (entitled "Applied Artificial Intelligence Technology for Contextualizing Words to a Knowledge Base Using Natural Language Processing", filed Feb. 15, 2019), Ser. No. 16/277,006 (entitled "Applied Artificial Intelligence Technology for Conversational Inferencing Using Named Entity Reduction", filed Feb. 15, 2019), and Ser. No. 16/277,008 (entitled "Applied Artificial Intelligence Technology for Building a Knowledge Base Using Natural Language Processing", filed Feb. 15, 2019); the entire disclosures of each of which are incorporated herein by reference. As explained in the above-referenced and incorporated Ser. No. 16/183,230 patent application, the NLG system 108 can employ a conditional outcome framework to determine the ideas that should be expressed in the narrative that is produced in response to the parameterized communication goal statement. Once the ideas have been generated by the conditional outcome framework of the NLG system 108, the NLG system can then form these ideas into a narrative using the techniques described in the above-referenced and incorporated Ser. No. 16/183,230 patent application to generate the natural language output. Through the training techniques discussed herein, this natural language output will stylistically resemble the training data by including one or more expressions that are derived from the linguistic features detected in and extracted from the training data.

I. Linguistic Features

Figure 3:
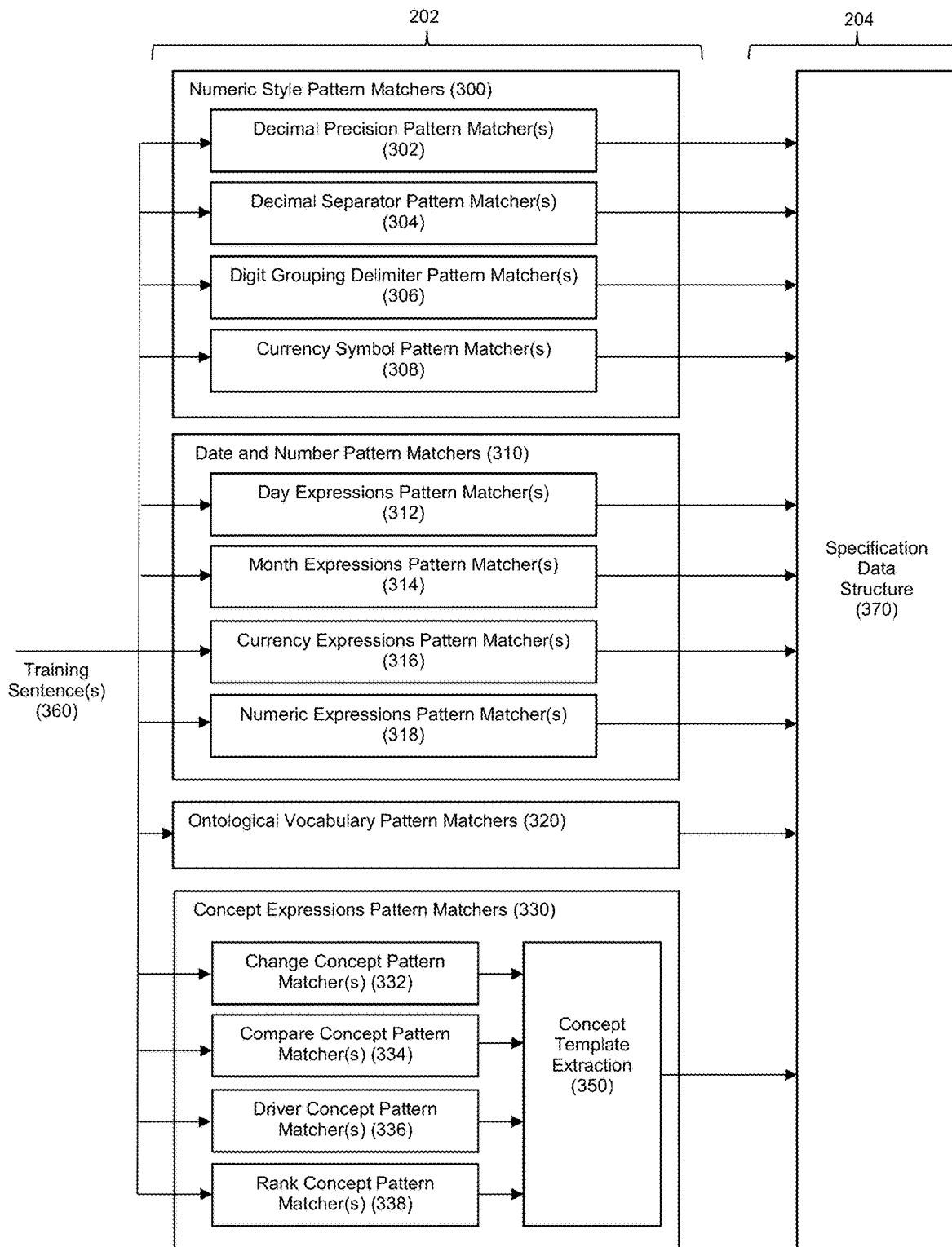
FIG. 3 shows an example process flow for extracting linguistic features from training data and aggregating the extracted linguistic features into a specification data structure.

FIG. 3 depicts an example architecture for implementing systems 202 and 204 within the training system 106. A variety of different pattern matchers can be employed to detect and extract linguistic features from the training data 126. These pattern matchers can be implemented in software code within the training system 106. In an example embodiment, the pattern matchers can employ regular expression (RegEx) pattern matching where regular expressions are used to define the patterns sought via the matching process. In example embodiments, the training system 106 can include numeric style pattern matchers 300, date and number pattern matchers 310, ontological vocabulary pattern matchers 320, and concept expressions pattern matchers 330. Examples of each of these will be discussed below. The linguistic features detected and extracted via the pattern matchers can then be aggregated into a specification data structure 370.

I(A). Numeric Styles

The numeric styles class of linguistic features is concerned with how numeric values are rendered in text. Numeric style pattern matchers 300 can detect and extract different aspects of numeric style expressed by numbers within the training data. The pattern matchers within 300 (examples of which are discussed below) can use regular expressions to define the generalized patterns sought within the training data 126 so that specific instances of the patterns can be recognized. Each pattern matcher can be run against the full text of each document within the training data 126, and the constituents of each match can be captured for aggregation into the specification data structure 370.

One or more decision precision pattern matchers 302 can be configured to determine the number of digits contained in the fractional part of a number written in decimal form. For example, the number "5.5" exhibits a single digit of decimal precision, while the number "5.539" exhibits 3 digits of decimal precision. Regular expressions can be employed to detect numbers written in decimal form, and then associated logic can be used to count how many digits are to the right of the decimal.

One or more decimal separator pattern matchers 304 can be configured to determine the character that is used by a number string to separate the integer part of the number from the fractional part of the number. For example, often times a period "." is used to denote the decimal in a number, but sometimes other characters are used, such as a comma ",". Regular expressions can be employed to detect numbers written in decimal form, and then associated logic can be used to determine the character being used to separate the integer and fractional portions. For example, the decimal separator pattern matcher 304 can return a period as the decimal separator if the input number is "305.59", and it can return a comma as the decimal separator if the input number is "305,59".

One or more digit grouping delimiter pattern matchers 306 can be configured to determine the character that is used by a number string to divide groups of integers in large integers that represent values over 1000. For example, often times a comma "," is used to separate rightmost groupings of 3 digits in an integer, but sometimes other characters are used, such as a period "." or white space. Regular expressions can be employed to detect the presence of large integers that represent values over 1000, and then associated logic can be used to determine the character being used to separate the integer portions in groups of 3 digits starting from the rightmost integer digit. For example, the digit grouping delimiter pattern matcher 306 can return a comma as the digit grouping delimiter if the input number is "30,000"; it can return a period as the digit grouping delimiter if the input number is "30.000"; and it can return white space as the digit grouping delimiter if the input number is "30 000". Disambiguation techniques can be applied to distinguish between numbers that may be ambiguous as to whether they are large integers or small integers with a fractional component following a decimal. As an example, if the decimal separator character is unknown, then the number "5,536" could be interpreted as five thousand five hundred thirty six (if the decimal separator is a period) or it could be interpreted as five point five three six (if the decimal separator is a comma). Possible disambiguation options can include resolving decimal separation and digit grouping hierarchically (e.g., excluding a character found to be a decimal separator from consideration as a digit grouping delimiter), or flagging ambiguous cases for resolution via user input, etc.

One or more currency symbol pattern matchers 308 can be configured to determine the character that is used as a currency symbol within a string that expresses a currency value. Regular expressions can be employed to detect the currency values, and then associated logic can return the character used as the currency symbol (e.g., $, ¥, €, etc.).

I(B). Date and Number Expressions

The date and numbers class of linguistic features is concerned with the form of how numbers and dates are expressed in text. Date and number pattern matchers 310 can detect and extract different aspects of the formats for dates and numbers within the training data. The pattern matchers within 310 (examples of which are discussed below) can use regular expressions to define the generalized patterns sought within the training data 126 so that specific instances of the patterns can be recognized. Each pattern matcher can be run against the full text of each document within the training data 126, and the constituents of each match can be captured for aggregation into the specification data structure 370.

One or more day expressions pattern matchers 312 can be configured to determine the textual form in which days of the year are expressed (e.g., "Monday, Jan. 13 2018", "01/13/2018", "13/01/2018", "Jan. 13, 2018", etc.). Regular expressions can be employed to detect which of a set of possible day expression patterns are present within the training data.

One or more month expressions pattern matchers 314 can be configured to determine the textual form in which months of the year are expressed (e.g., "January 2018", "Jan. 2018", "01/2018", etc.). Regular expressions can be employed to detect which of a set of possible month expression patterns are present within the training data.

One or more currency expressions pattern matchers 316 can be configured to determine the textual form in which currency values are expressed (e.g., "$20", "20 USD", "20 US Dollars", etc.). Regular expressions can be employed to detect which of a set of possible currency expression patterns are present within the training data.

One or more numeric expressions pattern matchers 318 can be configured to determine the textual form in which integer and decimal values are expressed (e.g., "Three Thousand Eighteen", "3018", etc.). Regular expressions can be employed to detect which of a set of possible numeric expression patterns are present within the training data.

I(C). Ontological Vocabulary

The ontological vocabulary class of linguistic features is concerned with the words used to represent ontological entities and relationships within the training data. Different information domains might refer to the same notional entity using different lexicons (e.g., Company A might refer to sales personnel as "salespeople" while Company B might refer to sales personnel as "sales associates"). The ontological vocabulary pattern matchers 320 can use data accessible to the underlying NLG system (e.g., supporting data 110) to automatically detect ontologically-significant words, particularly nouns and verbs. For example, the ontological vocabulary pattern matchers 320 can leverage an ontology used by the NLG system 108, which can contain a rich ontology that may include human-readable labels and linguistic expression forms that span one or more domains. Other data sources that can be tapped can include data sources that contain named instances of ontological entities, as well as name attribute values related to known entities. Although specific named instances may not have any relevance to vocabulary features and NLG expressions, they can help disambiguate relationship and/or attribute words. Such data sources can be used to build a text search index that maps specific words back to their corresponding ontological entities, where the text search index is for use by the ontological vocabulary pattern matchers 320. The system can build the index by traversing all nodes in the ontology as well as all fields in the underlying data sources via a data access layer for the training system 106.

As an example, consider the following ontology:
Entity: salesperson
Expressions: salesperson, account executive
Entity: sale
Expressions: sale, transaction, auction
Relationship: sells
Participating Entities: salesperson, sale
Expressions: sells, achieves, earns
As well as the following dataset, in tabular form:

| salesperson | sales | region | year |
|---|---|---|---|
| Aaron Young | 50000 | East | 2018 |
| Daisy Bailey | 51000 | West | 2018 |

Once the data above is loaded into the system, the ontological vocabulary pattern matchers 320 can extract vocabulary features and infer preferences from any of the following examples of unstructured text:

"In 2018, the top account executive was Tom Reynolds, with a total of 56,000".
  Identified: "account executive"
  Result: Express salesperson entities as "account executive"

"In 2018, Aaron Young achieved 50,000 transactions"
  Identified: "Aaron Young", "achieved", "transactions"
  Result: Express relationship of sales+salespeople as "achieve"

FIG. 4A discloses an example process flow for performing ontological vocabulary pattern matching. As used herein, the term "named entity" refers to any ontological or data atom that the NLP system 106 recognizes in training data. As such, it should be understood that the term named entity refers to more than just the entities that are described as part of an ontology 410 within the supporting data 110. Examples of different types of named entities can include entity types (e.g., salesperson), entity instances (e.g., John, who is an instance of a salesperson), attributes (e.g., sales, which are an attribute of a salesperson), attribute values, timeframes, relationship types, relationships, qualifiers, outcomes, entity bindings, and predicate bindings.

At step 400 of FIG. 4A, the system builds a tree structure that can be used for recognizing named entities in the training data (e.g., the sentences of a training document or other training input), for example a prefix tree. This tree can pull information from the knowledge base such as the sources shown in FIG. 4A, which may include an ontology 410, project data 412, linguistic/deictic context 414, and general knowledge 416.

The ontology 410 can be the ontology for a data set addressed by the message, an example of such an ontology is described in the above-referenced and incorporated Ser. No. 16/183,230 patent application.

The project data 412 represents the data set that serves as a project-specific knowledge base. For example, the project data 412 can be the sales data for the salespeople of a company. Thus, the project data 412 may include a number of entity instances and attribute values for the entity types and attributes of the ontology 410.

The deictic context 414 can be a data structure that maps referring terms such as pronouns and demonstratives in the training data to specific named entities in the supporting data 110. This linguistic/deictic context can help the system know how to map referring terms such as pronouns that are mentioned in the training data to specific entities that are mentioned in the training data. An example of technology that can be used to build such a linguistic/deictic context is described in (1) U.S. patent application 62/612,820, filed Jan. 2, 2018, and entitled "Context Saliency-Based Deictic Parser for Natural Language Generation and Natural Language Processing", (2) U.S. patent application Ser. No. 16/233,746, filed Dec. 27, 2018, and entitled "Context Saliency-Based Deictic Parser for Natural Language Generation", and (3) U.S. patent application Ser. No. 16/233,776, filed Dec. 27, 2018, and entitled "Context Saliency-Based Deictic Parser for Natural Language Processing", the entire disclosures of each of which are incorporated herein by reference.

The general knowledge 416 can be a data structure that identifies the words that people commonly use to describe data and timeframes (e.g., "highest", etc.).

Step 400 can operate to read through these data sources and extract each unique instance of a named entity that is found to be present in the data sources, and build the prefix tree that allows the system to later recognize these named entities in the words of the training data and then map those named entities to elements in the ontology 410, project data 412, deictic context 414, and/or general knowledge that are understood by the system. Also, if desired by a practitioner, it should be understood that step 400 can be performed as a pre-processing step that happens before any training data is received by the NLP training system 106.

FIG. 4B shows a simple example of a prefix tree that can be built as a result of step 400. It should be understood that for many projects, the prefix tree would be much larger. In this example, it can be seen that the name "Aaron Young" was found in the knowledge base of data sources as an entity instance, the word "generate" was found in the knowledge base of data sources as an attribute of sales value, the pronoun "he" was found to be contextually relevant to the entity instance of Aaron Young, and so on for other named entities as shown by FIG. 4B. Given that the ontology 410 may include a variety of different expressions for ontological elements (as described in the above-referenced and incorporated Ser. No. 16/183,230 patent application), it should be understood that the prefix tree can be highly robust at recognizing the meaning of a large number of words within the context of a training data set. For example, expressions such as "sales", "sells", "deals", "moves", "transactions", etc. can be linked to an attribute such as the sales of a salesperson to allow the system to recognize a wide variety of words in training data that relates to sales data. In general, it can be expected that (1) nouns will often map to entity types, entity instances, characterizations, attributes, and qualifiers, (2) verbs will often map to attributes and relationships, (3) adjectives will often map to qualifiers and characterizations, and (4) prepositions will often map to relationships; however this need not always be the case and will depend on the nature of the data sources accessed by step 400.

Then, step 402 maps words in the training data to named entities in the prefix tree. Thus, if the word "Aaron" appears in the training data, this can be recognized and mapped via the prefix tree to the entity instance of Aaron Young, and if the word "generate" appears in the training data, this can be recognized and mapped via the prefix tree to the attribute of sales value.

I(D). Concept Expressions

The concept expressions class of linguistic features is concerned with the sequence of words or phrases used in the training data to express NLG concepts. Concept expressions pattern matchers 330 can be used to infer the high level concepts that are expressed in the training data, and they thus represent a particularly powerful and innovative aspect that can be employed in example embodiments of training system 106. Examples of concepts that can be detected by pattern matchers 330 include:

Change: An example of a sentence that expresses a change concept is "Imports of steel fell sharply in 2018, down 43% from the previous year."

Compare: An example of a sentence that expresses a compare concept is "Imports of steel were lower in 2018 than the previous year."

Driver: An example of a sentence that expresses a driver concept is "New tariffs contributed to the decrease in steel imports."

Rank: An example of a sentence that expresses a rank concept is "The top 3 steel exporters by volume are China, Russia, and India."

The concept expressions pattern matchers 330 can use metadata derived from NLP tools and a series of rule-based heuristics to identify candidates for concept expressions, ultimately producing an annotated template that can be structurally compatible with the NLG system 108.

The system can be configured to assume that all concept expressions contain an anchor word, a single or compound word that is globally unique to a particular concept. The system can then use occurrences of these anchor words to identify candidate phrases for template extraction. Examples of specific anchor words for several concepts are listed below.

For example, one or more change concept pattern matchers 332 can be configured to detect the presence of any of the following anchor words in a training sentence. Upon detection of one of these anchor words, the subject training sentence can be categorized as a candidate for a change expression and get passed to template extraction logic 350 (discussed below). Examples of anchor words for a change concept can include:
increase
reduction
decrease
decline
rise
fall
raise
lower
lift
drop
grow
shrink
gain
lose
up
down
improve
worsen
slump
upturn
downturn
gains
losses As another example, one or more compare concept pattern matchers 334 can be configured to detect the presence of any of the following anchor words in a training sentence. Upon detection of one of these anchor words, the subject training sentence can be categorized as a candidate for a compare expression and get passed to template extraction logic 350 (discussed below). Examples of anchor words for a compare concept can include:
more
less
fewer
greater
lesser
higher
lower
superior
inferior
exceed As another example, one or more driver concept pattern matchers 336 can be configured to detect the presence of any of the following anchor words in a training sentence. Upon detection of one of these anchor words, the subject training sentence can be categorized as a candidate for a driver expression and get passed to template extraction logic 350 (discussed below). Examples of anchor words for a driver concept can include:
    drive
    detract
    contribute
    aid
    counteract
    help
    hurt
    impact As another example, one or more rank concept pattern matchers 338 can be configured to detect the presence of any of the following anchor words in a training sentence. Upon detection of one of these anchor words, the subject training sentence can be categorized as a candidate for a rank expression and get passed to template extraction logic 350 (discussed below). Examples of anchor words for a rank concept can include:
    best
    worst
    top
    bottom
    top most
    bottom most
    top ranked
    bottom ranked
    largest
    smallest However, it should be understood that more, fewer, and/or different anchor words can be used for detecting these concept candidates. For example, a thesaurus could be used to find appropriate synonyms for each of these anchor words to further expand the pools of "change", "compare", "driver", and "rank" anchor words.

Furthermore, while the examples discussed herein describe "change", "compare", "driver", and "rank" concepts, it should be understood that a practitioner may choose to detect other concepts that could be present within training data. For example, any of "peaks and troughs" concepts, "volatility" concepts, "correlation" concepts, "prediction" concepts, "distribution" concepts, and others can also be detected using the techniques described herein. Following below are some additional examples of concepts that can be expressed in sentences and for which concept expression templates could be extracted using the techniques described herein:

"Actual versus Benchmark" Concept: "The best period was Oct. when Total Likes outperformed Fan Acquisition Target Goal by 7.537."

"Compound Annual Growth Rate" (CAGR) Concept: "If that growth rate were to continue, Sale Volume is forecast to be $7.34 billion by 2022."

"Clusters" Concept: "When organized into groups of similar Stadiums and Capacity values, one distinct group stands out. There were 28 entities that had values of Stadiums between three and 17 and Capacity between zero and 165,910."

"Concentration" Concept: "Crime Count is relatively concentrated with 60% of the total represented by 35 of the 161 entities (22%)."

"Correlation" Concept: "Profit and revenue had a strong positive correlation, suggesting that as one (profit) increases, so does the other (revenue), or vice versa."

"Current versus Previous" Concept: "Compared to the previous year, the average across all months decreased from $92.7 million to $84.2 million."

"Cyclicity" Concept: "Sale Volume experienced cyclicality, repeating each cycle about every 8.2 years."

"Distribution" Concept: "The distribution is negatively skewed as the average of 4.2 million is greater than the median of 4.2 million."

"Intersection" Concept: "Total Quantity was lower than Total Revenue for the first 6% of the series, but at 02/2010 Total Quantity increased above Total Revenue and remained higher for the last 94% of the series."

"Min Max" Concept: "Values ranged from 54% (Easy System Chat) to 118% (Phone)."

"Outliers" Concept: "PASSAT and JETTA were exceptions with very high Miles Per Gallon values."

"Percentage of Whole" Concept: "Over the course of the series, Honduras accounted for 15% of top keyword totals, election accounted for 9.92%, and president accounted for 8.74%."

"Peak/Trough" Concept: "Total Sales had a significant dip between February-2013 ($7,125) and May-2013 ($7, 417), falling to $5,430 in March-2013."

"Segments" Concept: "Total Contacts Completed fluctuated over the course of the series with 60% of data points moving in an opposite direction from the previous point."

"Streak" Concept: "The largest net growth was from August 2017 to December 2017, when Variable (Line) increased by 36 percentage points."

Further still, while a single anchor word is used to assign a candidate concept classification to training sentences in the example embodiment discussed above, it should be understood that a practitioner could also use an anchor word in combination with additional metadata (such as part of speech tagging) or a combination of anchor words to infer concepts from training sentences. For example, a practitioner may conclude that the word "fewer" could be indicative of both a "change" concept and a "compare" concept, and additional words and/or rules could be used to further resolve which classification should be applied to the subject training sentence. As another example, the detection of a rank concept when the word "top" is present in the training data can be made dependent on whether "top" is being used in the subject sentence as an adjective (in which case the rank candidacy can get triggered) or as a noun (in which case the rank candidacy may not get triggered).

Figure 5:
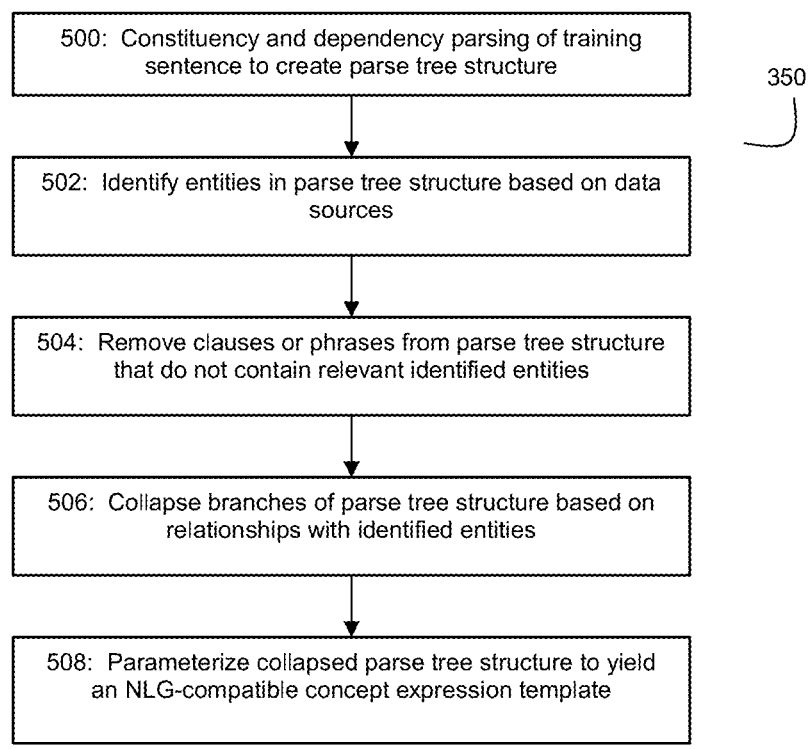
FIG. 5 shows an example process flow for detecting and extracting concept expression templates from training data.

Once candidate phrases have been identified via the anchor word detection, the candidate phrases are then parsed and evaluated by template extraction logic 350 before producing a concept expression template. The template creation process can employ a sequence of rule-based heuristics, examples of which are discussed below. For example, FIG. 5 discloses an example process flow for template extraction. For purposes of elaboration, this FIG. 5 process flow will be discussed in the context of the following unstructured text that expresses a change concept:

"The United States division experienced a large drop in sales in June 2017 compared to the previous year, which prompted this meeting."

With this example, the change concept pattern matcher 332 will detect the anchor word "drop" in the training sentence, and the template extraction logic 350 will attempt to extract a change expression template from this training sentence.

Figure 6A:
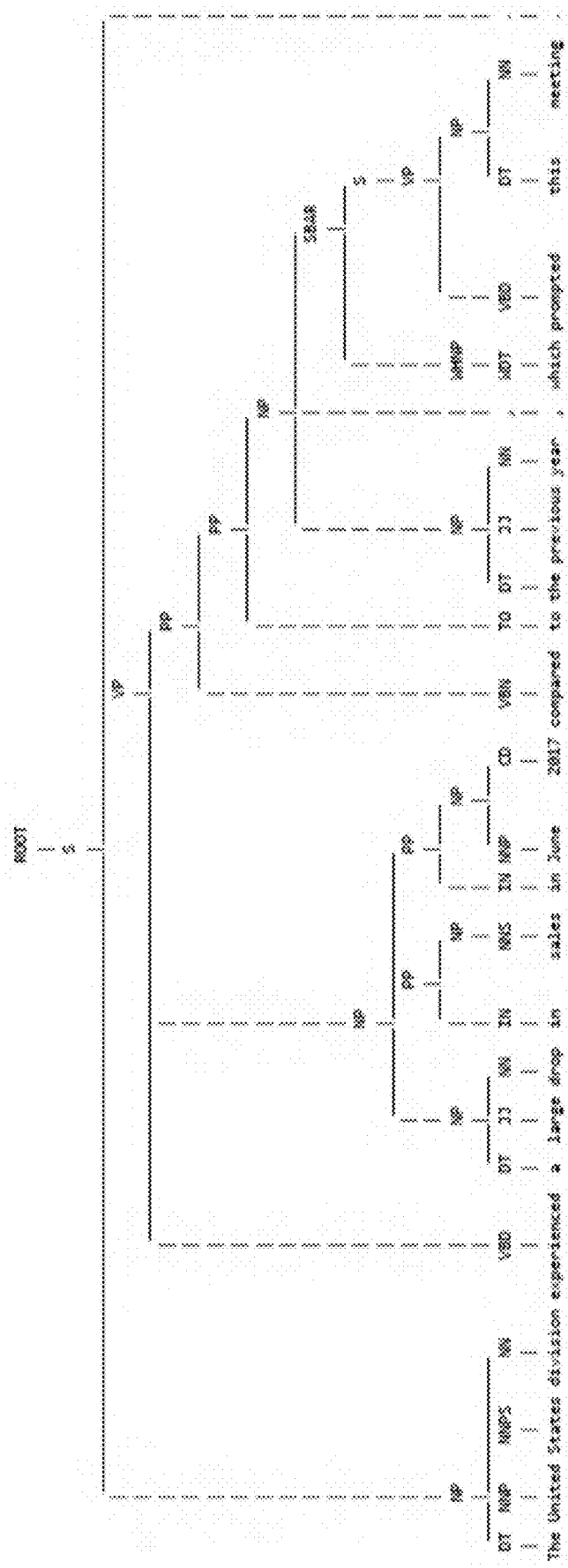
FIGS. 6A-6D show examples of parse tree structures at various stages of the FIG. 5 process flow.

At step 500, a processor performs constituency parsing and dependency parsing on the training sentence to create a parse tree structure. Additional details for example embodiments of constituency parsing and dependency parsing are discussed below. FIG. 6A shows an example parse tree structure that can be generated at step 500 from the example sentence above. In this example, the parse tree structure corresponds to the constituency parse tree.

At step 502, a processor identifies entities in the parse tree structure based on data sources such as an ontology. This step can be performed using named entity recognition (NER) techniques, and an example of an NER technique that can be performed on the parse tree structure of FIG. 6A is discussed above with respect to FIG. 4A. However, the NER of step 502 need not draw from the ontology 410 used by NLG system 108; instead the ontology used by the NER of step 502 can use existing ontologies that are available in combination with parsing tools that can be used at step 500. Entities that can be identified at step 502 (even if ontology 410 is not used) can include organizations, person names, dates, currencies, etc. With respect to the leaf nodes of the parse tree structure example of FIG. 6A, step 502 can recognize the following entities:

United States
June 2017
previous year

Figure 6B:
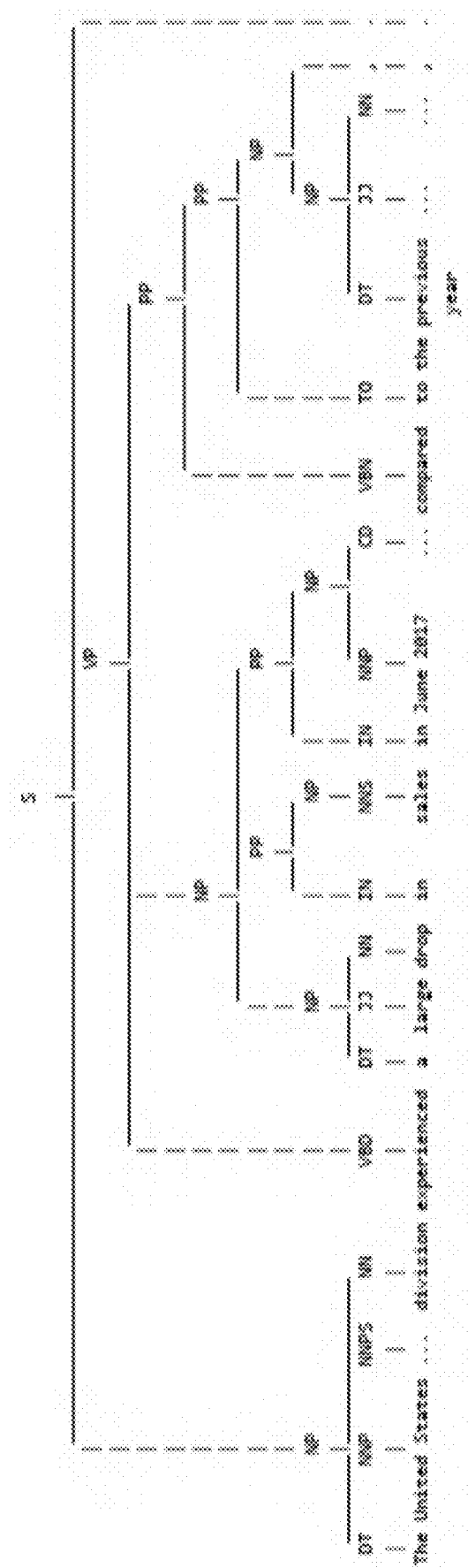

At step 504, a processor prunes clauses in the parse tree structure by removing clauses or phrases from the parse tree structure that do not contain relevant identified entities. For the parse tree structure of FIG. 6A, step 504 will operate to remove the right-most subordinate clause (SBAR) ("which prompted this meeting") because this clause does not contain any entities identified at step 502. FIG. 6B shows the example parse tree structure after the pruning of step 504 has been performed.

Figure 6C:
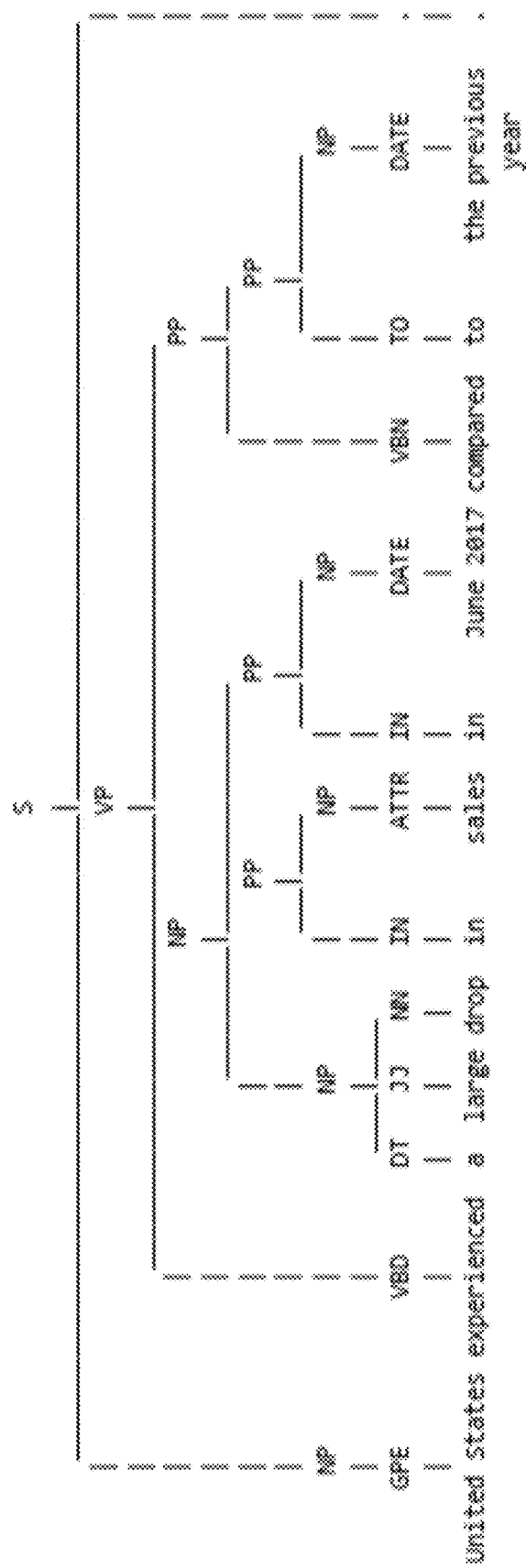

At step 506, a processor collapses branches of the pruned parse tree structure based on relationships with identified entities. For example, step 506 can discard sibling tree nodes of any branches with known entities or attributes. With reference to the pruned parse tree structure of FIG. 6B, step 506 can operate to discard the siblings of "United States", "June 2017", and "the previous year" within the tree structure. FIG. 6C shows the parse tree structure after step 506 has been performed to make these removals.

Figure 6D:
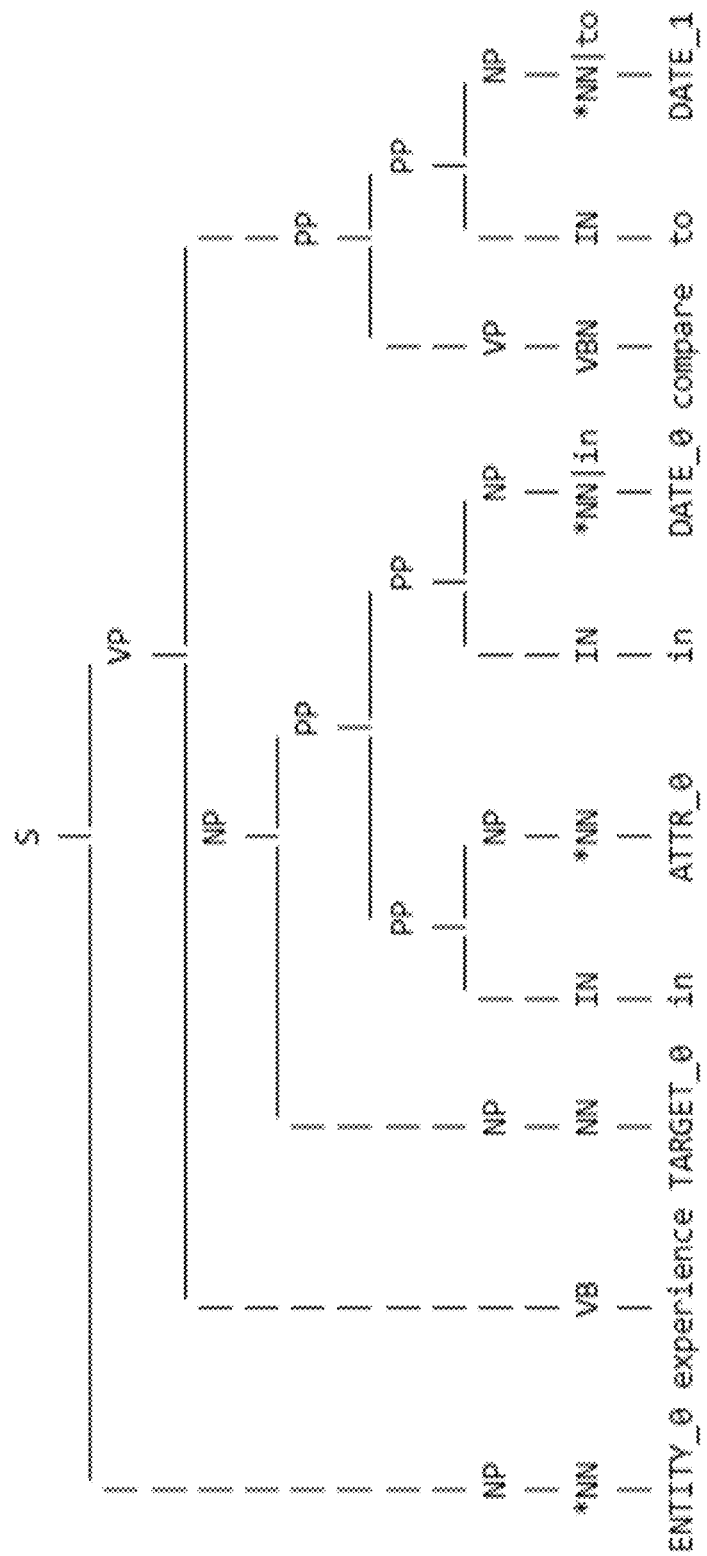
Figure 6E:
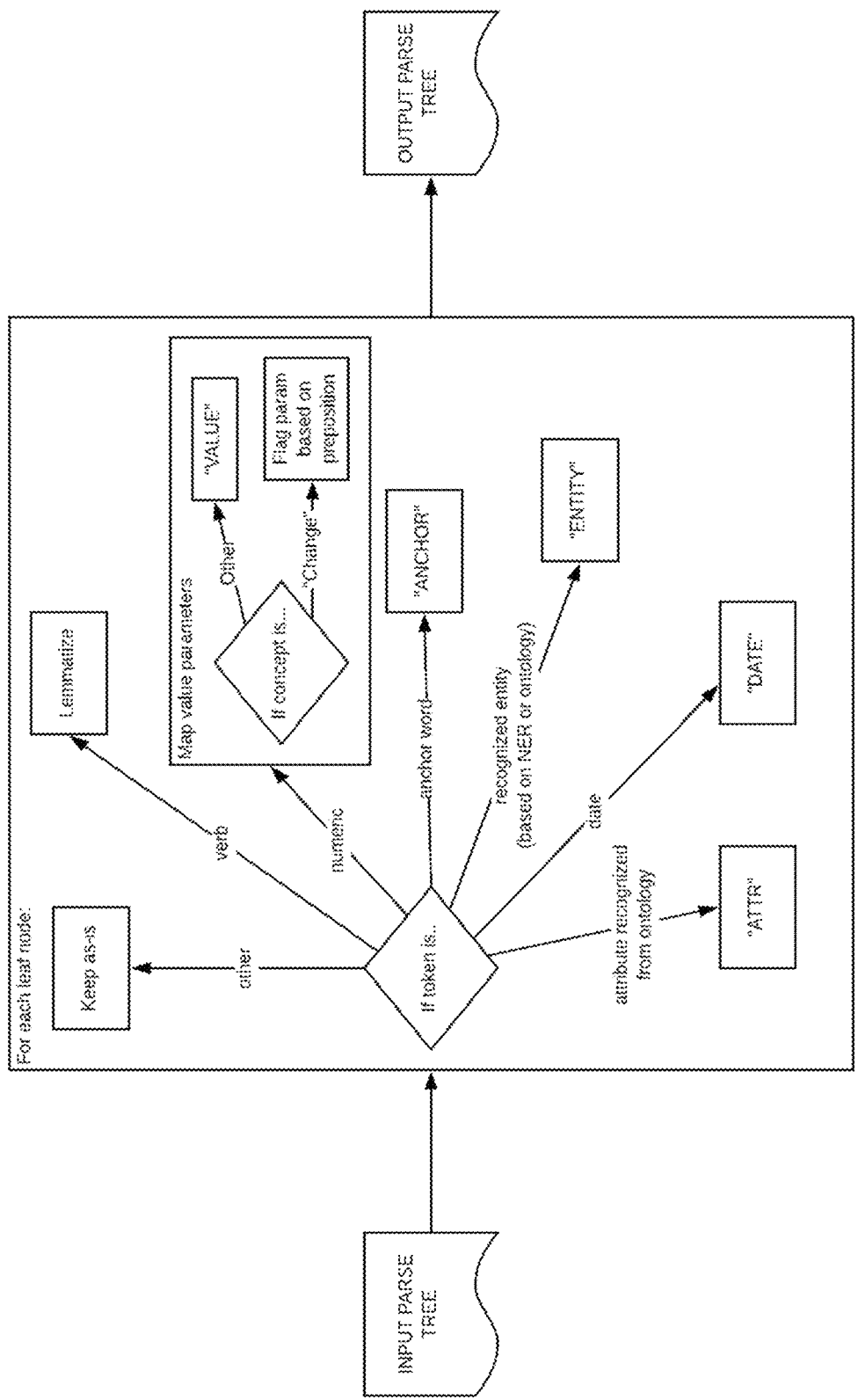
FIG. 6E shows an example process flow for transforming and/or tagging tokens in a parse tree with NLG-compatible labels.

At step 508, a processor parameterizes the collapsed parse tree structure to yield an NLG-compatible concept expression template. The NLG-compatible concept expression template can include semantically-significant variable slots. With respect to the running example, the following transformations can occur as part of step 508:

"United States" (GPE)→"ENTITY_0" (NN)—by virtue of recognition of the words "United States" as an entity.
"a large drop"→ANCHOR_0—by virtue of recognition of the word "drop" as an anchor word
"Sales" (ATTR)→ATTR_0 (NN)—by virtue of recognition of the word "sales" as being an attribute in ontology 410
"June 2017" (DATE)→DATE_0 (NN)—by virtue of recognition of this string as referring to a date
"the previous year" (DATE)→DATE_1 (NN)—by virtue of recognition of this string as referring to a date FIG. 6D shows the parameterized parse tree structure that can be produced by step 508. Also, the parameterization step 508 can include concept-specific rules. For example, the parameterization of a change concept can look for numeric values and then separately parameterize "from" and "to" values in a change expression. FIG. 6E shows an example process flow for transforming and/or tagging tokens in a parse tree with NLG-compatible labels.

Figure 7:
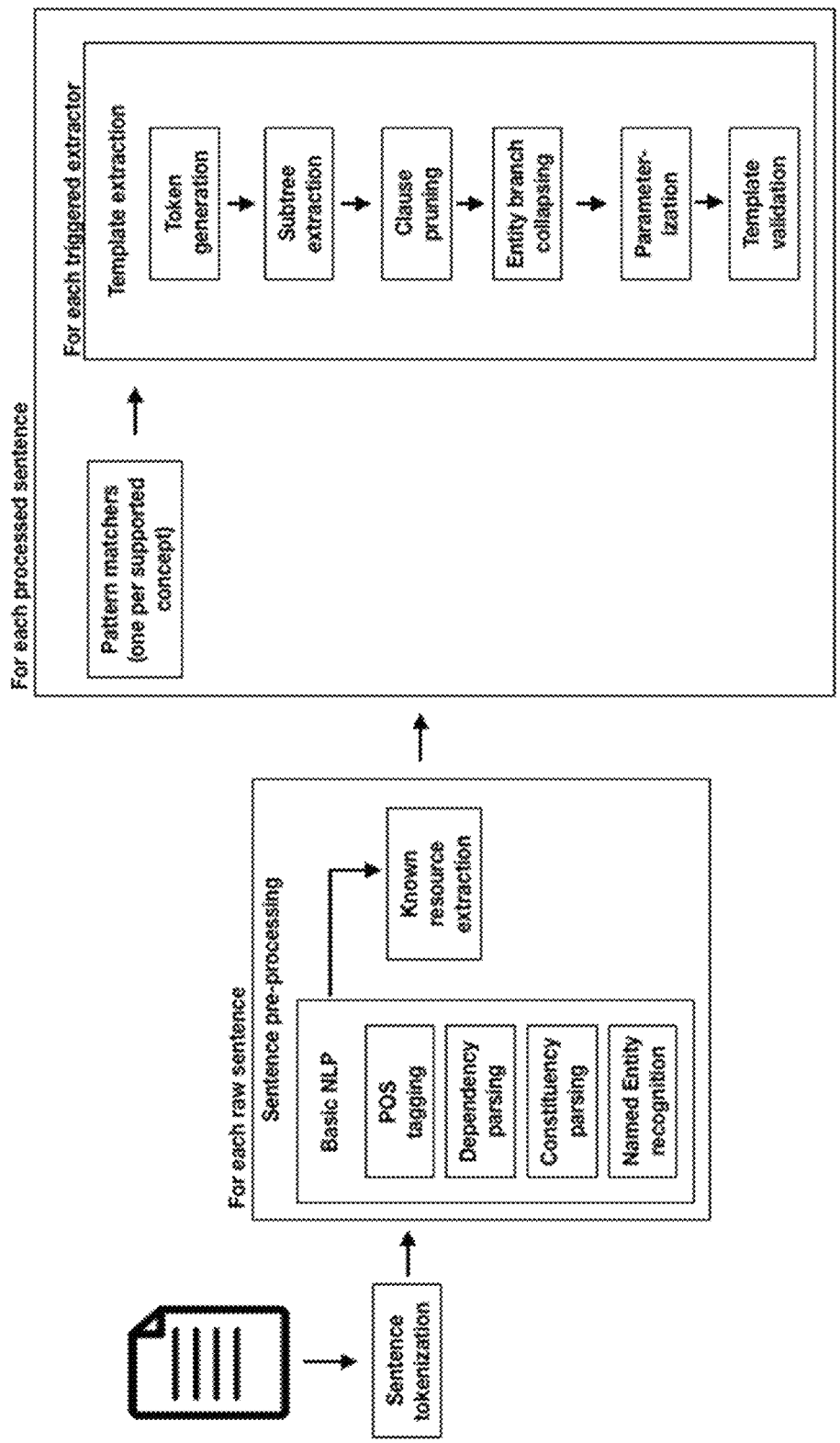
FIG. 7 shows another example schematic for end-to-end detection and extraction of concept expression templates from training data.

FIG. 7 shows an end-to-end process flow for extracting concept expression templates from training data for another example embodiment. This process flow can include the following:
1. Tokenizing a document into sentences
2. For each sentence:
   a. Pre-processing with a suite of NLP techniques (dependency and constituency parsing, named entity recognition)
   b. Leveraging a user's' data and the NLG system's ontology to identify and flag known resources (entities, attributes)
3. For each pre-processed sentence:
   a. Passing the sentence through a separate pattern matcher for each concept supported by the NLG system
   b. For each template extractor triggered by its associated pattern matcher, applying a set of heuristics to extract the relevant subtree from the parsed sentence and parameterize the sentence into a form compatible with the NLG system.

Through this process, a raw sentence like "The United States saw a $5000 increase in sales in the cycle ending in February." can be converted to a parameterized template of the form "$ENTITY_0 see $BY-VALUE_0 ANCHOR_0 in $ATTR_0 in $DATE_0" that can be used by the NLG system 108 to generate new sentences of a similar form. The following sections will now describe details about various aspects of the FIG. 7 embodiment.

Sentence Pre-Processing

Given an input document, the training system can first use a sentence tokenizer to split the document into sentences that are then passed on for further processing. An example of a sentence that can produced by the tokenizer is:

"The United States saw a $5000 increase in sales in the cycle ending in February."

Figure 8A:
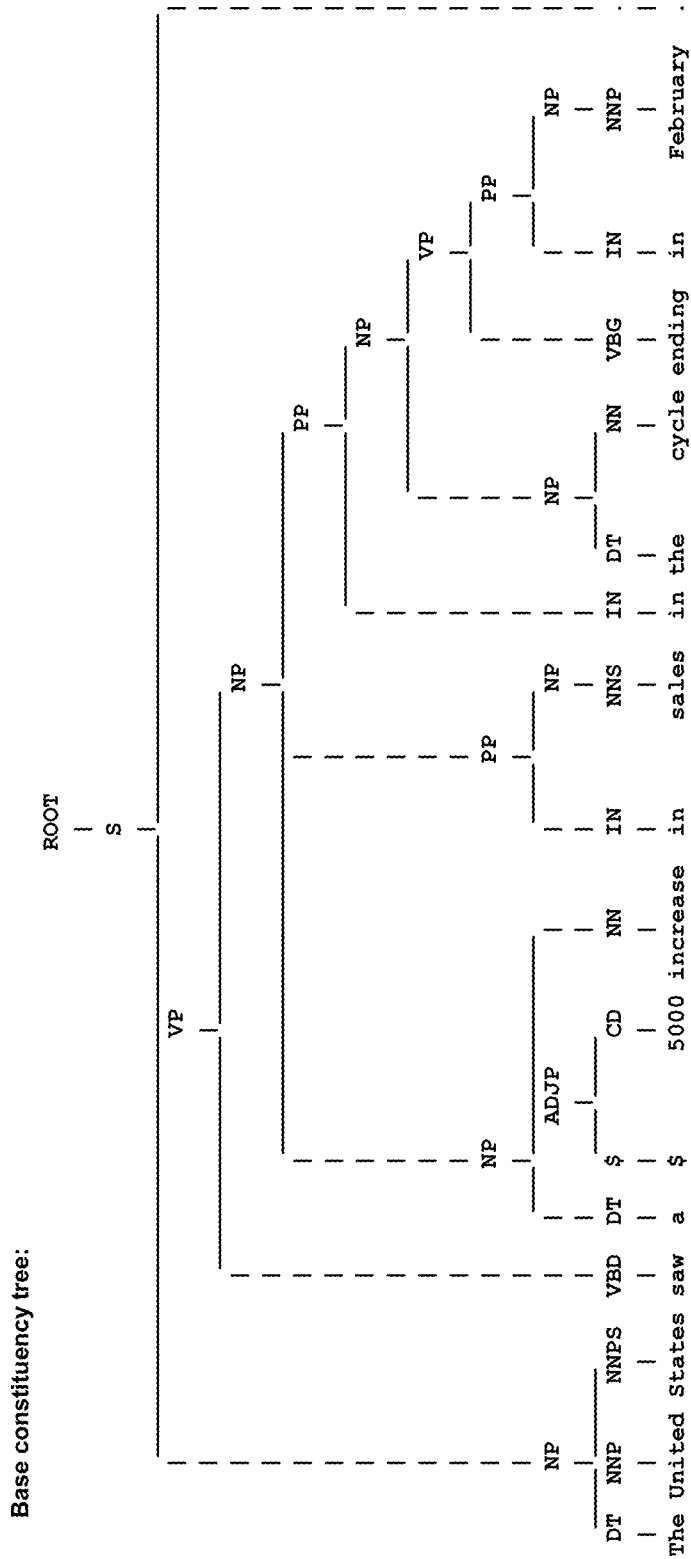
FIGS. 8A-8I show examples of parse tree structures and other text examples at various stages of the FIG. 7 process.

Each sentence is then passed through two NLP tools—one for constituency parsing and one for dependency parsing. An example of a tool that can be used for constituency parsing is Stanford's CoreNLP. CoreNLP can be used to generate a constituency tree for the sentence. An example of a tool that can be used for dependency parsing is Explosion AI's Spacy. Spacy can be used to generate a dependency parse and part-of-speech tags, and it can also perform named entity recognition (NER). This NER is an NLP practice that uses static dictionaries and heuristics (e.g. capitalization) to recognize and flag person names ("Aaron Young"), geopolitical entities ("United States"), dates ("February"), etc. FIG. 8A shows a basic constituency tree produced as a result of sentence pre-processing. While CoreNLP and Spacy are used for the constituency parsing and dependency parsing in an example embodiment, it should be understood that other tools can be used for these parsing operations. For example, Microsoft Azure's linguistics API may be used for constituency parsing, and tools such as CoreNLP and Google's cloud NLP tools can be used for dependency parsing if desired by a practitioner.

The system can perform both a dependency and constituency parse because they serve unique roles in the template extraction process. The dependency parse is useful for determining the linguistic roles and relationships of different tokens in the sentence (e.g. determining the preposition associated with a given numeric value, or which verb has a recognized attribute as its object). The constituency tree, on the other hand, is important for building a tree structure compatible with the NLG system 108.

The system next applies a known resource extraction process such as the one described in connection with FIG. 4A. The known resource extraction process flags tokens that are recognized as corresponding to known entities or attributes of entities. These known entities and attributes come from two sources:

a. The NLG system's ontology—as noted above, the ontology utilized by the NLG system can have a library of known entities, attributes, and relationships, and the extraction logic can scan sentences for any instances of tokens matching these known ontological entities. For example, "sales" is recognized concept in our ontology, so is tagged as an attribute.

b. User data—if a user has uploaded data or has linked the system to a database, the extraction logic can also recognize string data values in a sentence as entities or attributes. For example, if a user has a data representing product names, the known resource extractor would recognize (and thus be able to parameterize downstream) that "Gizmotron 5000" is an entity in the sentence "The best selling product was the Gizmotron 5000", even though that term does not appear in the NLG system ontology, nor could be recognized by a standard NER.

The NLP results, extracted known resources, and raw sentence string for each sentence are set as a metadata on a node object that is passed to the template pattern matchers for further processing.

Pattern Matching to Identify Sentences Expressing a Concept

For all concepts expressible by the NLG system (e.g., "change", "comparison", "rank", etc.), the training system can implement a separate pattern matcher used to identify sentences expressing that concept, as noted above in connection with FIG. 3. As previously discussed, the pattern matchers can be implemented using "anchor words", and the system can maintain a dictionary of anchor words, stored as tuples of (positive, negative) pairs, along with part of speech. For example, a subset of anchor words for the "change" concept can include:

('increase', Noun), ('decrease', Noun),
('increase', Verb), ('decrease', Verb),
('grow', Verb), ('shrink', Verb),
('gains', 'Noun'), ('losses', 'Noun'), While tuples can be used in an example embodiment, it should be understood that other combinations could be employed to store representations of the anchor words. For example, the anchor word representations can be expanded to be triples where an additional item captures "change" relations (e.g., more, less, equal).

The "rank" concept includes "top", "bottommost", and "best"; the "compare" concept includes "more", "less"; etc.

The training system thus implements a pattern matcher for each supported concept that scans the processed sentences, and is triggered any time it recognizes an anchor word/part-of-speech pair associated with the concept. Each processed sentence is passed through pattern matchers, and for each that is triggered the training system initiates the template extraction process.

Template Extraction

When the pattern matcher for a given concept is triggered, the training system attempts to templatize the triggering sentence. This involves the following steps:

1. Token Generation and Substitution

Figure 8B:
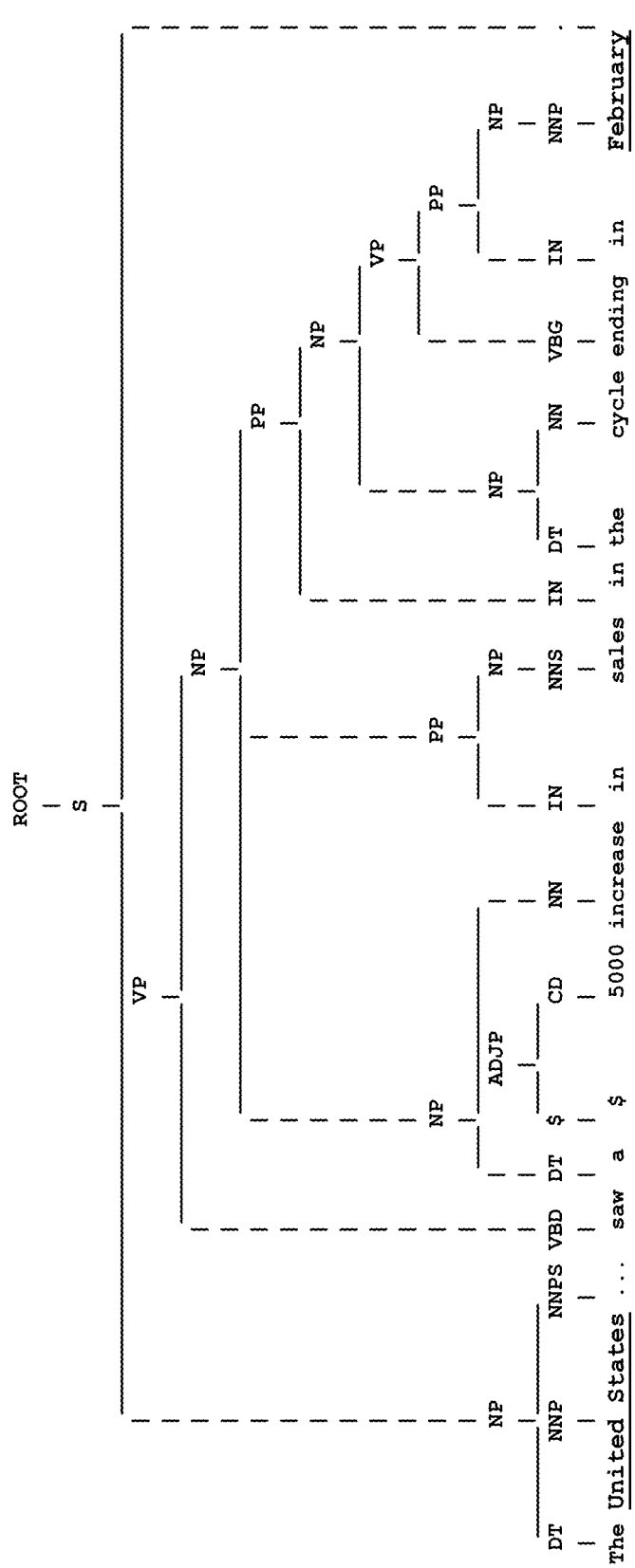

As mentioned above, each sentence is processed with both CoreNLP (for the constituency tree) and Spacy (for NER, dependencies, etc.). The first step of template extraction is to integrate the constituency tree with the Spacy token objects, replacing the leaves of the CoreNLP constituency tree with Spacy tokens and their associated metadata. For any recognized named entities (e.g. "United States" and "February" in this example), we collapse all words making up the named entity into a single leaf in the tree. FIG. 8B shows an example parse tree after this step (where "United States" and "February" are underlined to illustrate their status as recognized named entities.

2. Subtree Extraction

Figures 8C, 8D:
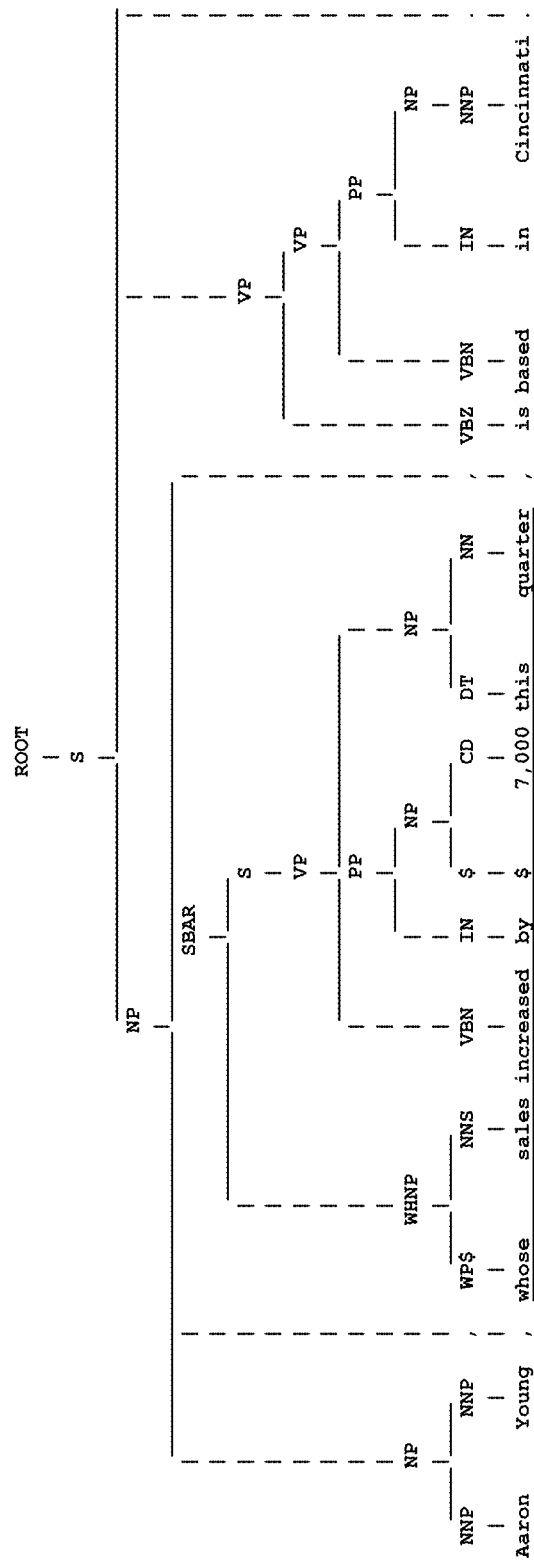
Figure 8E:
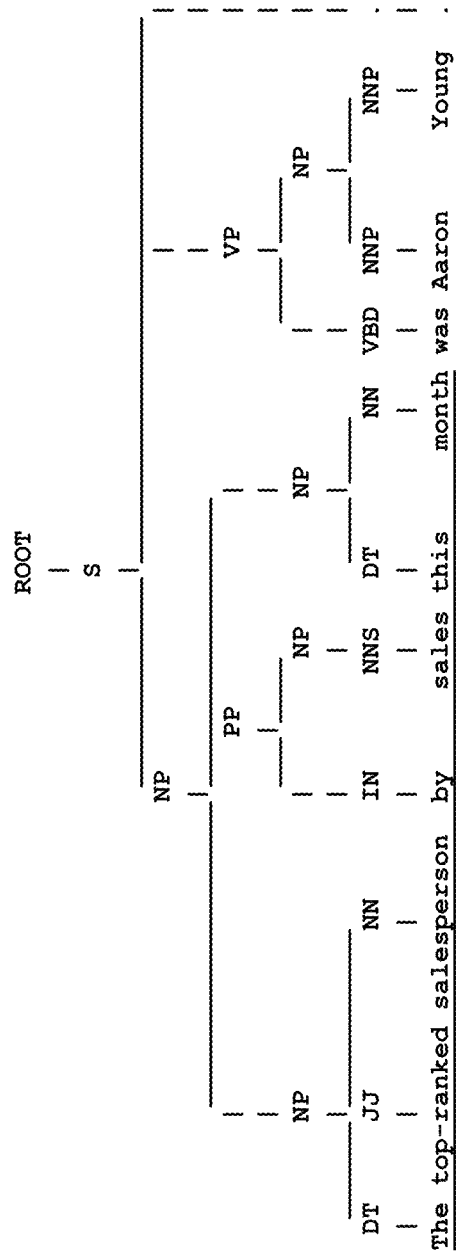

The next step is to extract from the complete parse tree the subtree expressing the identified concept. The default approach for this this is to move up the tree from the anchor word to the complete clause containing the anchor word. In the example of FIG. 8C, where "increased" is the anchor word, the system moves up the tree to the independent clause "whose sales increased by $7000 this quarter", and the rest of the sentence is discarded (see FIG. 8C). This amounts to selecting the underlined portion of the parse tree shown by FIG. 8D:

This logic can be overridden for particular template extractors as appropriate. For example, the "rank" concept extractor can be designed to move up the tree to the topmost containing noun phrase (see the underlined portion in the example of FIG. 8E).

3. Clause Pruning

Figures 8F, 8G:
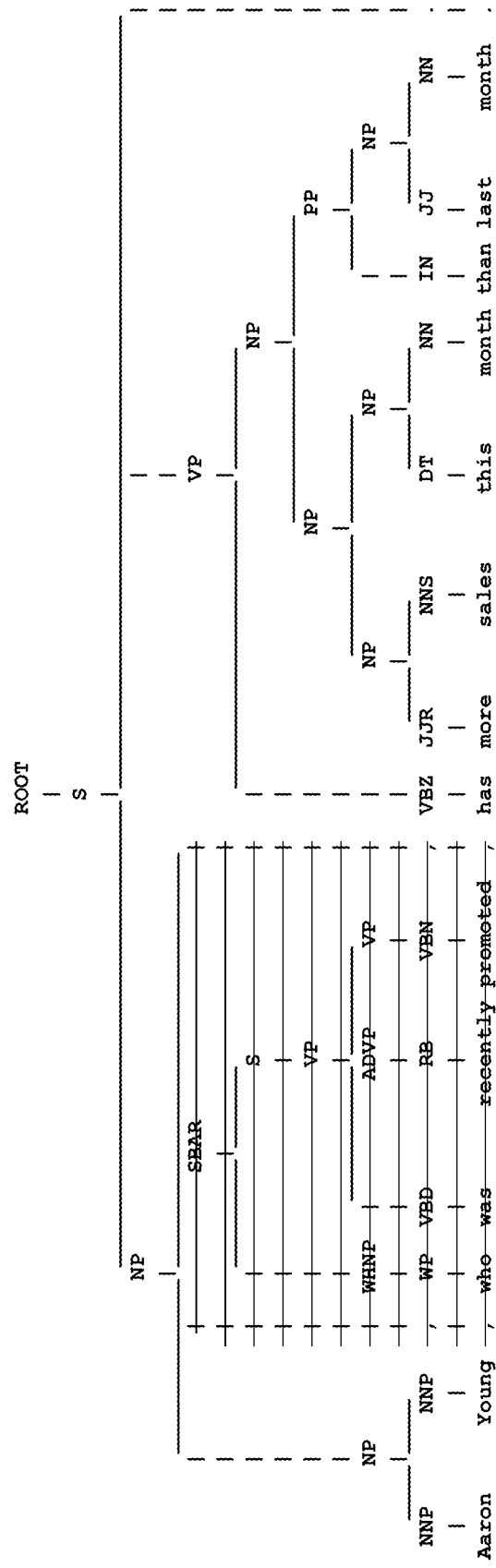

The training system then eliminates any clauses from the sentence that do not contain an anchor word or any known resources. In the example of FIG. 8F, this means dropping the clause "who was recently promoted" because it does mention a known resource or the anchor word ("more"). This amounts to dropping the crossed out elements in the example parse tree of FIG. 8G.

4. Known Resource/Entity Branch Collapsing

Figure 8H:
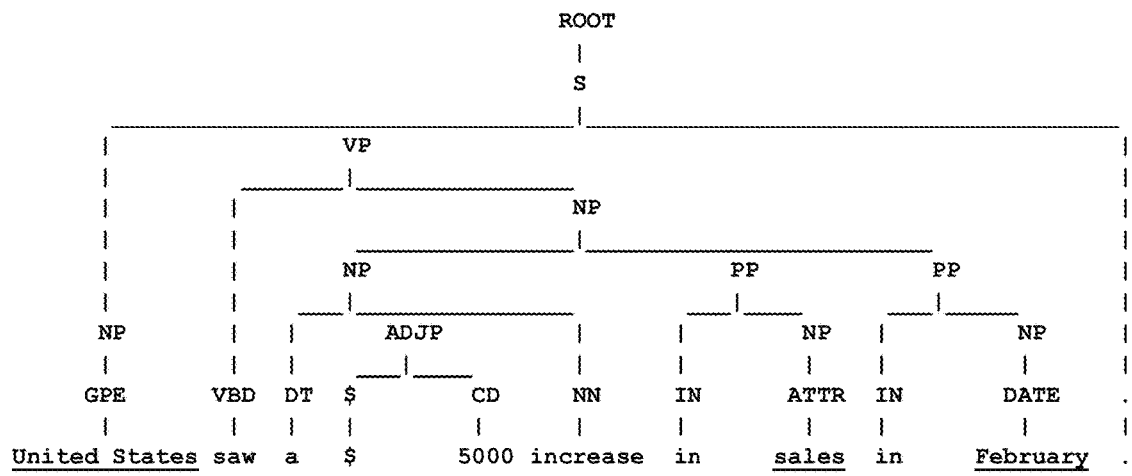

The next step is to collapse any branches containing known entity or attribute tokens (this includes both known resources extracted from the ontology or user data, or other entities recognized by NER during the initial Spacy pre-processing of the sentence). To accomplish this, the system moves up the tree from each recognized token to the highest containing noun phrase (NP) that that does not also contain an anchor word or another recognized token. For example, the initial NP ("The United States") is collapsed to a single NP containing only the token for "United States". The system does not collapse the NP containing "sales" beyond the bolded subtree in the example below, because the next highest NP ("a $5000 increase in sales in February") contains an anchor word ("increase) as well as another entity ("February"). If instead the sentence had referenced "average weekly sales", then that NP would have been collapsed to a single token NP including only "sales". FIG. 8H shows the example parse tree after the collapsing operation is performed.

5. Parameterization

Figure 8I:
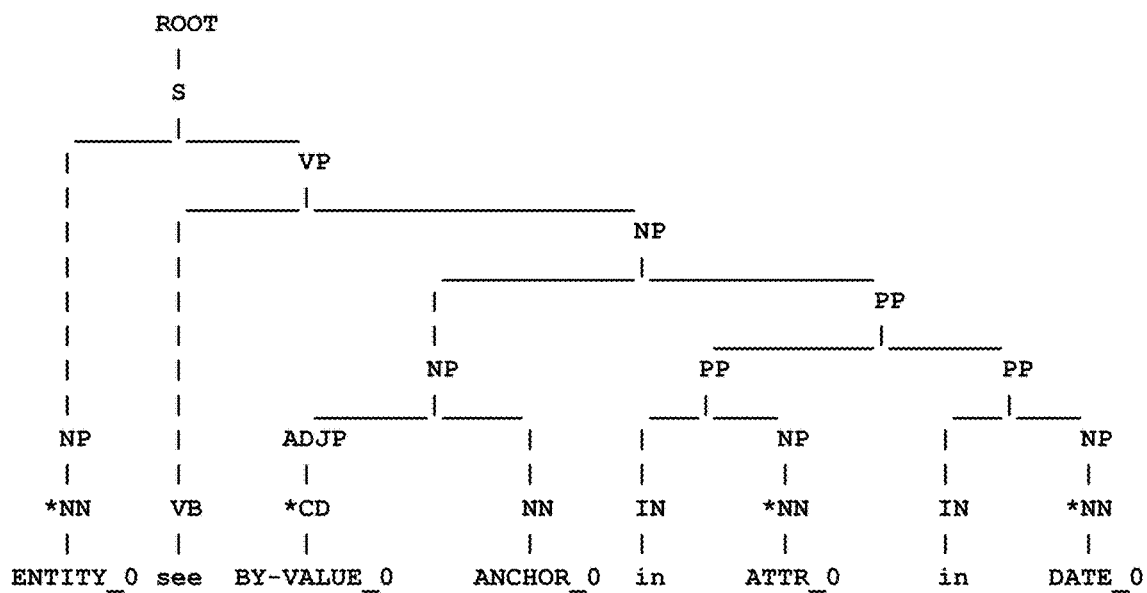

The final step is to parameterize the sentence into an abstracted form usable by the NLG system. For the template extractors, this involves replacing tokens for attributes, entities, and dates with enumerated variables (ENTITY_0, ENTITY_1, etc.). A second pass handles parameterization of concept-specific elements (in the example for "change" below, the system parameterizes the "BY-VALUE", and could do the same for the "TO" and "FROM" values if present). The system can also parameterize the anchor word, which allows for use of the template in NLG systems with synonyms for the anchor word (e.g. " . . . saw a dip in sales . . . ") or its opposite (" . . . saw a decrease in sales . . . "). FIG. 8I shows an example parameterization of the running parse tree example. This template can then be passed directly to the NLG system, which maps the variables in the template to runtime NLG objects to generate new sentences.

Notes on Template Validation

To ensure that generated templates are syntactically and semantically valid, the system can apply multiple passes of validation throughout the parsing and templatization process. If any of these fail, the system can raise an error when processing a sentence.
1. Constituency and dependency parsing is not a 100% accurate process (often due to sentence ambiguity, e.g., for the sentence "Enraged cow injures farmer with ax", who has the ax?), so a first validation check ensures that the dependency parse and constituency parse agree with respect to part-of-speech tags.
2. Each template extractor implements a custom parameter validation pass, which can ensure the set of parameterized sentence elements is valid for a given concept. For example, the "compare" concept can be designed so that it is required to contain either two entities or two attributes.
3. A final validation pass performs a syntactic validity check (e.g. does the sentence contain a proper subject and object) and an NLG compatibility check (ensuring that the final tree structure is consistent with the format expected by out NLG system.

II. Specification Data Structures

As noted above, the result of the extraction and aggregation phases is a specification data structure (such as a JSON specification), which is a machine-readable, declarative description of the linguistic features that the training system discovered. Each top-level key in the specification data structure can be a specific linguistic feature, whose value is a list of feature instances, grouped by their generalized form and sorted by frequency. Each list item contains a "count" value to indicate the number of times that generalized form was encountered. Examples of each feature's data structure in an example JSON specification are discussed below.

For example, FIG. 9A shows a portion of a JSON specification for the decimal precision linguistic feature discussed above. The count field identifies a count of the sentences in the training data that included relevant numeric values for the decimal precision feature, and the precision field identifies the value for the corresponding decimal precision. The FIG. 9A example also lists the relevant sentences in the training data for the decimal precision feature.

As another example, FIG. 9B shows a portion of a JSON specification for the decimal separator linguistic feature discussed above. The count field identifies a count of the sentences in the training data that included relevant numeric values for the decimal separator feature, and the separator field identifies the character used as the decimal separator for the subject count. The FIG. 9B example also lists the relevant sentences in the training data for the decimal separator feature.

As another example, FIG. 9C shows a portion of a JSON specification for the digit grouping delimiter linguistic feature discussed above. The count field identifies a count of the sentences in the training data that included relevant numeric values for the digit grouping delimiter feature, and the separator field identifies the character used as the digit grouping delimiter for the subject count. The FIG. 9C example also lists the relevant sentences in the training data for the digit grouping delimiter feature.

As another example, FIG. 9D shows a portion of a JSON specification for the currency symbol linguistic feature discussed above. The count field identifies a count of the sentences in the training data that included relevant currency values for the currency symbol feature, and the symbol field identifies the character used as the currency symbol for the subject count. The FIG. 9D example also lists the relevant sentences in the training data for the currency symbol feature.

As yet another example, FIG. 9E shows a portion of a JSON specification for the day expression linguistic feature discussed above. The count field identifies a count of the sentences in the training data that included relevant day expressions. Each feature instance contains the generalized format string used by programming languages to convert a date into a string (see "format_str" and "strftime" in FIG. 9E). The FIG. 9E example also lists the relevant sentences in the training data for the day expression feature.

As yet another example, FIG. 9F shows a portion of a JSON specification for the month expression linguistic feature discussed above. The count field identifies a count of the sentences in the training data that included relevant month expressions. Each feature instance contains the generalized format string used by programming languages to convert a month into a string (see "format_str" and "strftime" in FIG. 9F). The FIG. 9F example also lists the relevant sentences in the training data for the month expression feature.

As yet another example, FIG. 9G shows a portion of a JSON specification for the currency expression linguistic feature discussed above. The count field identifies a count of the sentences in the training data that included relevant currency expressions. Each feature instance contains several Boolean flags which describe various properties of the subject expression. The aggregation of these Boolean values can then be used to define the specific currency expression that was detected in the training data. The FIG. 9G example also lists the relevant sentences in the training data for the currency expression feature.

As yet another example, FIG. 9H shows a portion of a JSON specification for the numeric expression linguistic feature discussed above. The count field identifies a count of the sentences in the training data that included relevant numeric expressions. Each feature instance contains several Boolean flags which describe various properties of the subject expression (see the "format" portions of FIG. 9H). The aggregation of these Boolean values can then be used to define the specific numeric expression that was detected in the training data. The FIG. 9H example also lists the relevant sentences in the training data for the numeric expression feature.

As still another example, FIG. 9I shows a portion of a JSON specification for the ontological vocabulary linguistic feature discussed above. The count field identifies a count of the sentences in the training data that included a relevant ontological element as identified by the "expression" field, and different counts can be included for each ontological element found in the training data. Each feature instance contains a type ("object_type"), an ID reference ("object_ID") and an object label ("object_label") for its corresponding ontological node in the NLG system 108. The FIG. 9I example also lists the relevant sentences in the training data for subject ontological element.

As still another example, FIG. 9J shows a portion of a JSON specification for the concept expression feature discussed above. The count field identifies a count of the sentences in the training data that included a relevant concept as identified by the "concept" field, and different counts can be included for each concept found in the training data. Each concept instance can contain a representation (such as an ASCII representation) of the template data structure as well as the values corresponding to the template's parameters. Further still, each concept instance can identify the phrases and anchor words that were found to be matches to a concept within the training data. The FIG. 9J example also lists the relevant sentences in the training data for subject concept expression.

Furthermore, it should be understood that if multiple different instances of a detected linguistic feature are detected in the training data, the JSON specification can include a separate entry for each instance. The system can then choose which instance should be used for training the NLG system based on heuristics (e.g., choosing the most common instance to train) or based on user input (e.g., presenting the instances to a user as selectable options and then training the NLG system based on the user-selected instance). For example, with reference to FIG. 9A, if multiple decimal precisions were found in the training data, the JSON specification can separately identify each instance along with the count for those instances. Thus, if there were also 6 numbers in the training data where the decimal precision was 3 digits, there could be another entry in the JSON specification corresponding to this instance. The training process could then apply the most common instance (e.g., the decimal precision of 3 digits in this example) based on automated heuristics or rely on user input to decide which instance should be used for training.

III. User Interfaces

As noted above with reference to step 206, user interfaces can be provided to help a user control and review aspects of the training process. For example, a browser application can provide a user with interfaces for creating a document corpus, extracting features, and applying configuration changes to the NLG system 108.

Figure 10A:
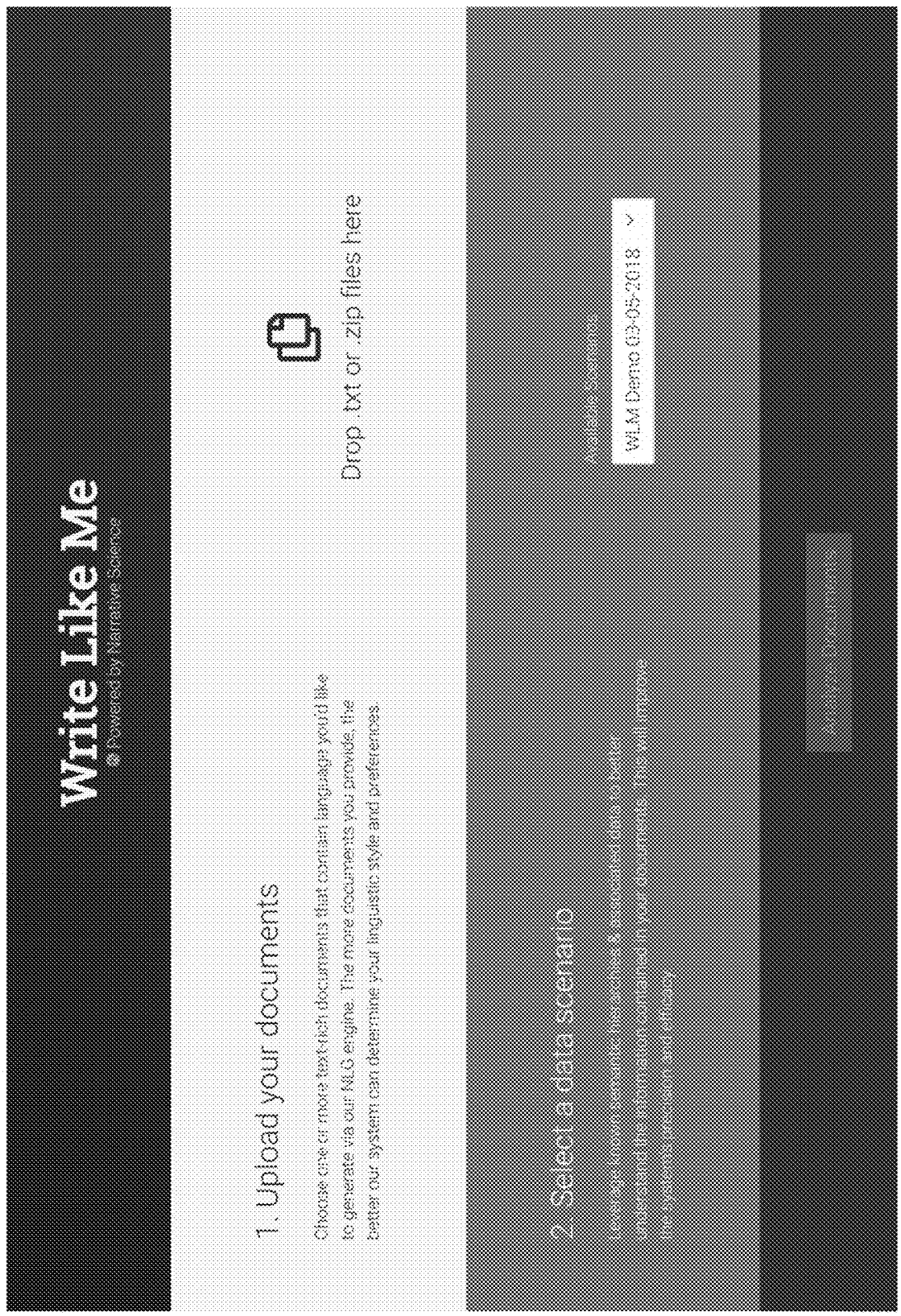
FIGS. 10A-10G show various example of user interfaces for controlling and operating the training system.

FIG. 10A shows an example GUI for document upload to provide the training system 106 with training data. This GUI can also specify a data scenario in response to user input, wherein the specified data scenario can be a domain-specific data set such as project data used by the NLG system 108. Such a data scenario may include an ontology and project data used by the training system and the NLG system as a knowledge base. This data scenario can also define the configuration that is to be modified based on the specification data structure extracted by the training system (and possibly modified via the user interfaces).

Figure 10B:
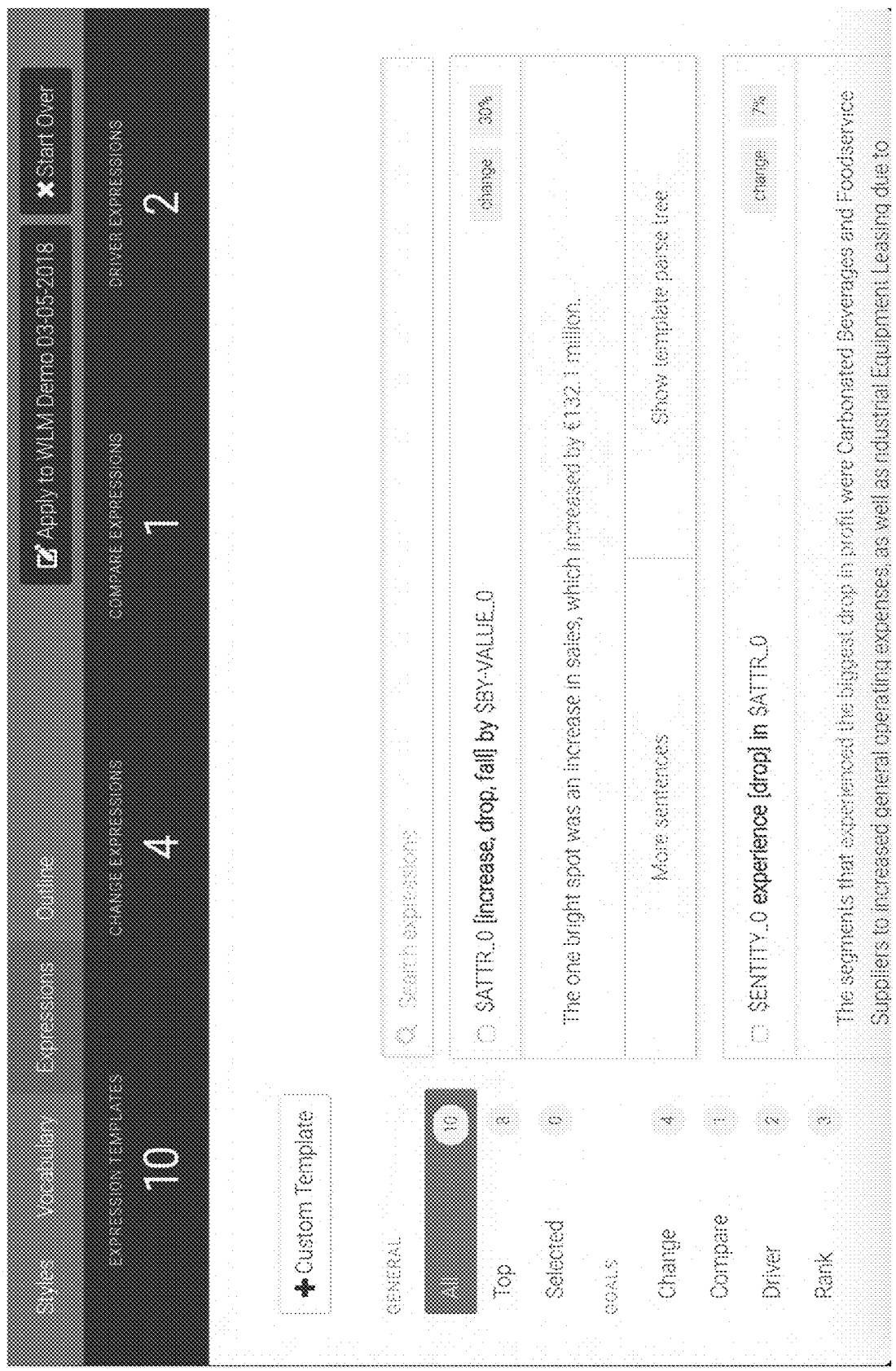
Figure 10C:

FIG. 10B shows an example GUI that allows a user to view and select concept expression templates that were detected within the training data. Each detected concept expression template can be separately listed in the GUI, and the listing can be accompanied by information that identifies the concept type (e.g., "change" in the example of FIG. 10B) as well as an example of one of the sentences in the training data from which the concept expression template was extracted. Further still, the GUI can show the prevalence of each concept expression template within the training data (which, for the example of FIG. 10B, was 30% for the first listed template and 7% for the second listed template). Each listing in the example of FIG. 10B serves as a model for describing change that can be used by the NLG system 108, and each listing can be selectable via a checkbox or the like to control whether that concept expression template is to be added to the NLG system 108 as a configuration and preferred over default expressions. The "More sentences" link can be selected if the user wants to review additional training sentences from which the subject concept expression template was extracted. The "Show template parse tree" link can be selected to show the corresponding parse tree for the subject concept expression template (see FIG. 10C).

The GUI of FIG. 10B can also summarize the different concept expression templates that were extracted from the training data. For example, the GUI of FIG. 10B shows that 10 concept expression templates were found in the training data, of which 4 were change expressions, 1 one a compare expression, 2 were driver expressions, etc.

In a particularly powerful aspect of an example embodiment, the GUI of FIG. 10B can be used to create custom templates in response to user input (see, e.g. the "+Custom Template" button). Upon selection of this button, the GUI can include a text entry field through which the user can enter a sentence. The training system can then process this sentence to extract a concept expression template from it. The extracted concept expression template can then be presented to the user via the GUI of FIG. 10B. This feature allows for users to create concept expression templates for use by the NLG system "on the fly". FIG. 10G discussed below further elaborates on customized template creation.

Figure 10D:
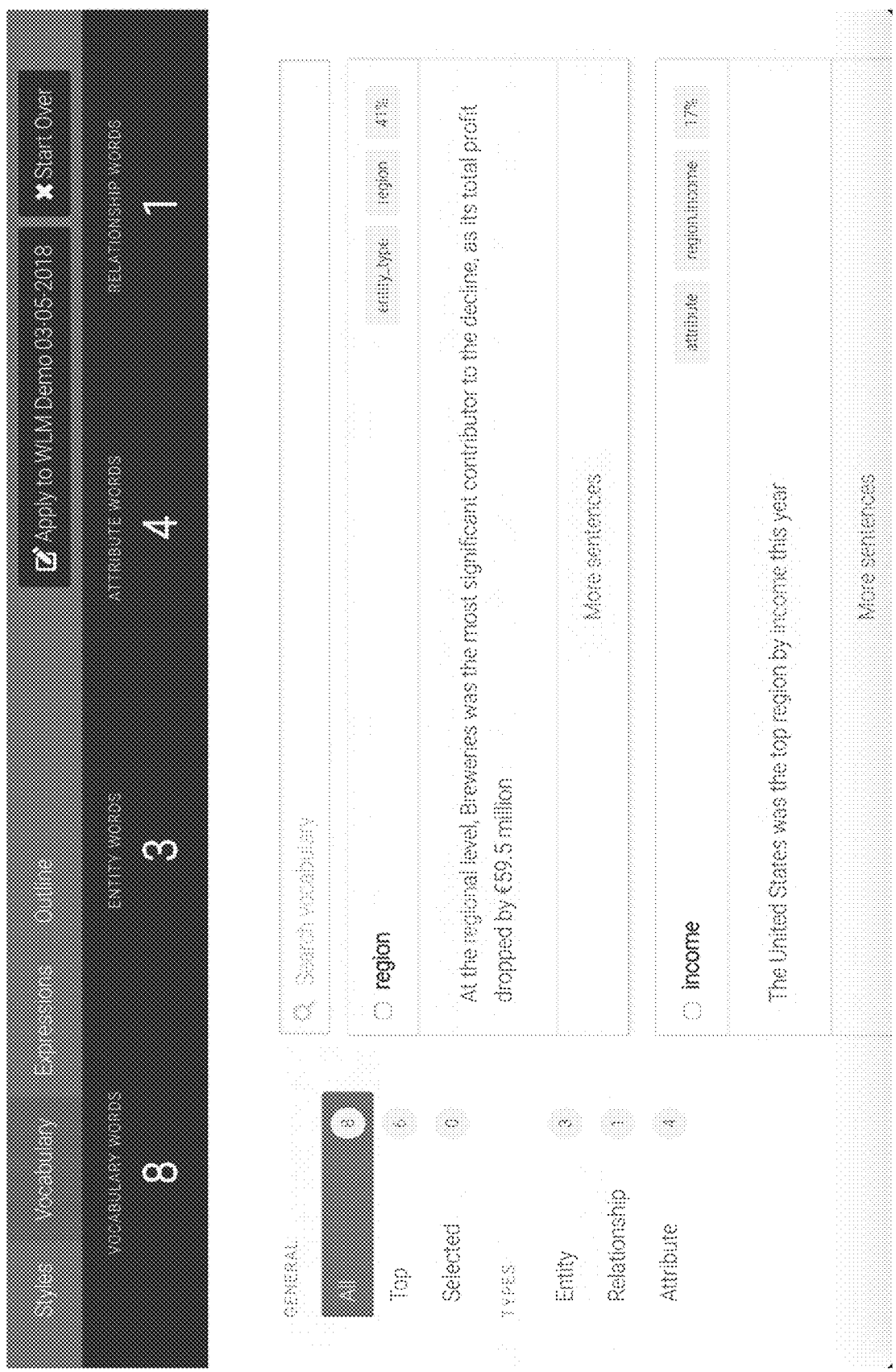
Figure 10E:
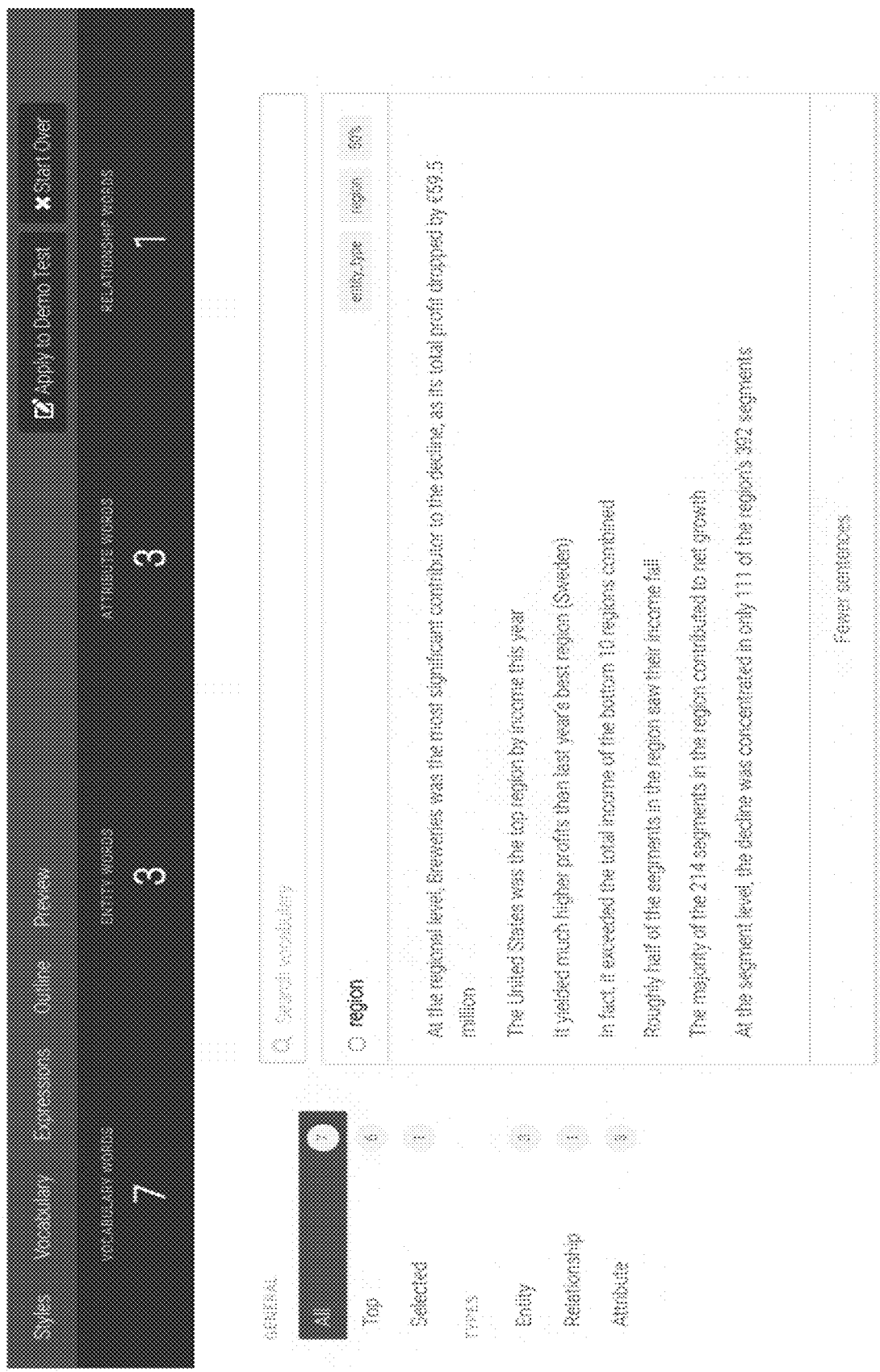

FIG. 10D shows an example GUI that allows a user to view and select the ontological vocabulary that was detected within the training data. Each detected item of ontological vocabulary can be separately listed in the GUI, and the listing can be accompanied by information that identifies the ontological object type (e.g., entity, type, attribute, etc.) as well as an example of one of the sentences in the training data from which the item of ontological vocabulary was extracted. Further still, the GUI can show the prevalence of each item of ontological vocabulary within the training data (which, for the example of FIG. 10B, was 41% for "region" and 17% for "income"). Each listing in the example of FIG. 10B can be selectable via a checkbox or the like to control whether that item of vocabulary is to be added to the NLG system 108 as a configuration and preferred over default expressions. Thus, if "region" is selected via the GUI of FIG. 10D, the word "region" can be included as the preferred expression for the subject ontological element in the ontology used by the NLG system 108. The "More sentences" link can be selected if the user wants to review additional training sentences from which the subject item of ontological vocabulary was extracted (see FIG. 10E).

The GUI of FIG. 10D can also summarize the ontological vocabulary extracted from the training data. For example, the GUI of FIG. 10D shows that 8 vocabulary words were found in the training data, of which 3 were entity words, 4 were attribute words, and 1 was a relationship word.

Figure 10F:
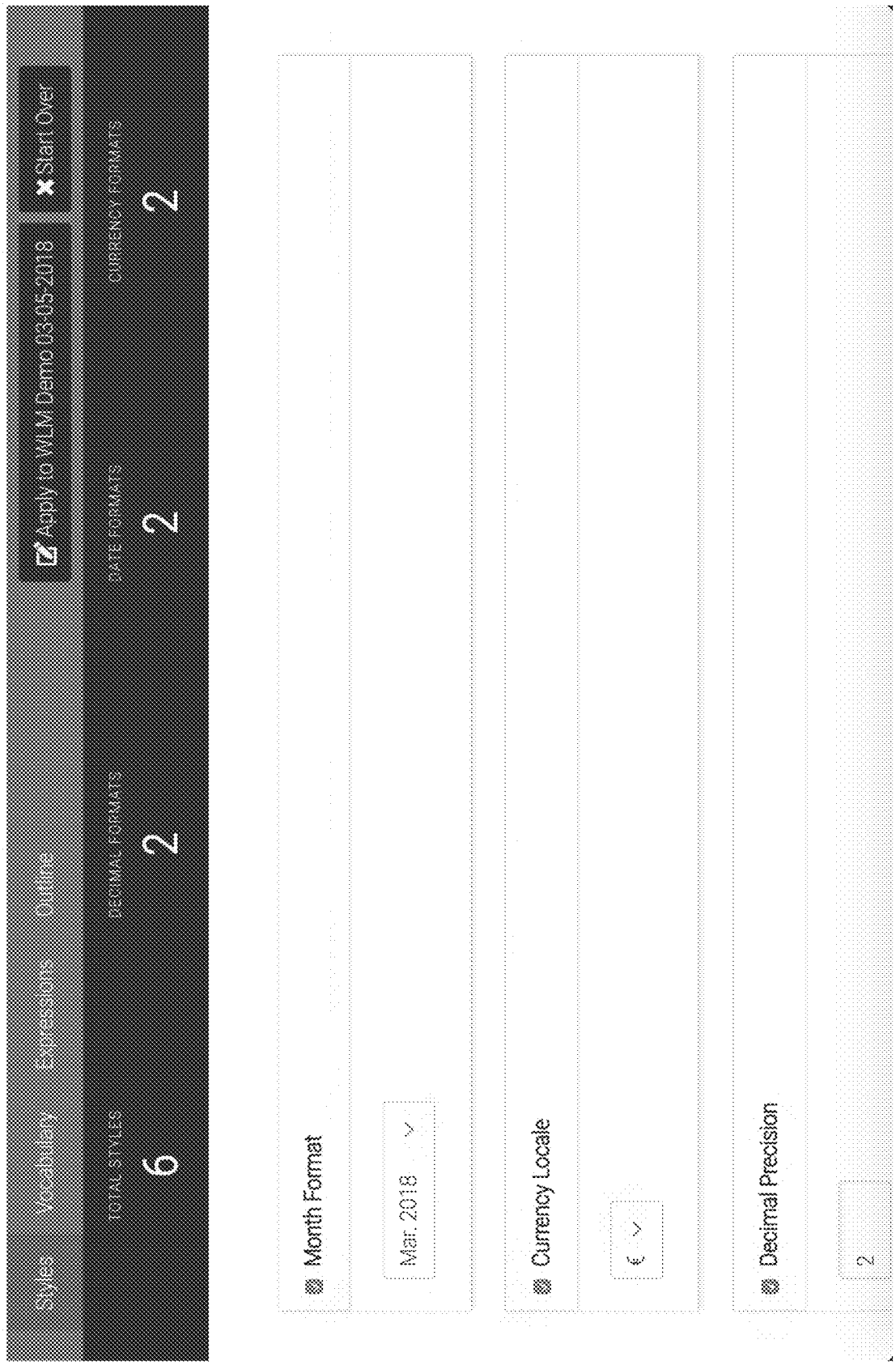
Figure 10G:
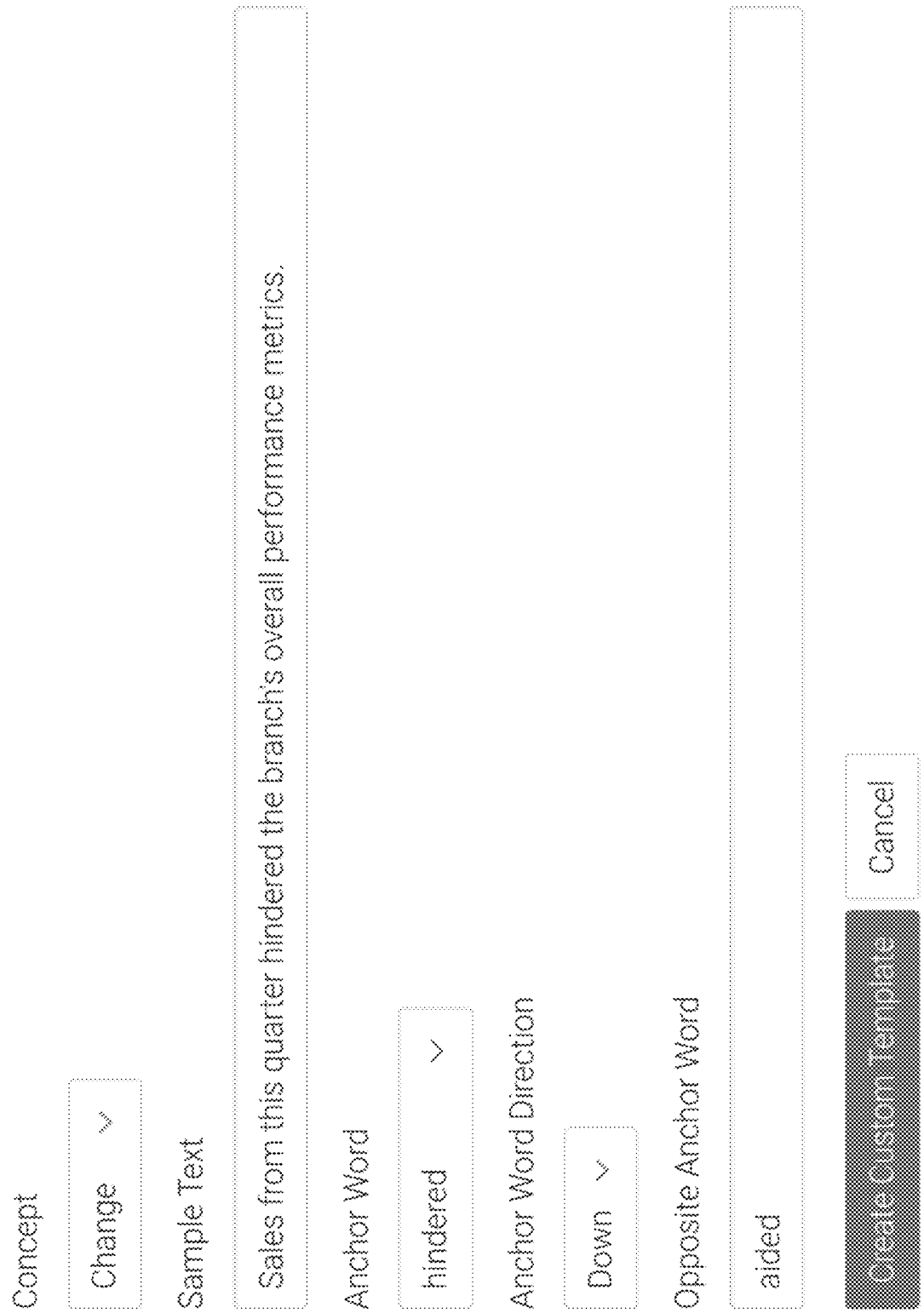

FIG. 10F shows an example GUI that allows a user to view and select the numeric styles, dates, and number patterns that were detected within the training data via pattern matches 300 and 310. Each category of style item can be separately listed in the GUI, and the listing can include a drop down menu that identifies the specific pattern instances of each style identified within the training data. The user can then select which of these detected instances should be used with the configuration data. For example, the drop down menu can be accessed, and the desired instance can be selected via the drop down menu to control whether that pattern instance is to be added to the NLG system 108 as a configuration and preferred over default expression patterns.

The GUI of FIG. 10F can also summarize the different styles extracted from the training data. For example, the GUI of FIG. 10F shows that 6 total styles were found in the training data, of which 2 were decimal format styles, 2 were date format styles, and 2 were currency format styles.

FIG. 10G shows an example GUI for creating a custom concept template. Through this GUI, a user can teach the training system a new concept template based on natural language text input by the user. The concept section of the GUI can include a dropdown menu that lists the available concepts for the training system. The user can select which of these concepts is to be used for the custom concept template. The sample text section of the GUI can include a data entry field through which the user types a sentence in a natural language, where this sentence expresses the subject concept in a format that the user wants to add to the system. The anchor word section of the GUI can be a drop down menu that is populated with all of the words of the entered sentence. The user can then select from this word list which of the words is to be used as the anchor word for the subject concept. The anchor word direction section of the GUI allows the user to specify a frame of reference for directionality with respect to the subject anchor word. This can be specified via a user selection of an option of possible directions presented via a drop down menu or the like. Thus, for the change concept anchor word of "hindered", the user input in the direction section can flag that the word "hindered" corresponds to a downward direction in the data. The opposite anchor word section can include a data entry field through which the user can enter the opposite/antonym of the subject anchor word. This opposite anchor word can also be added as an anchor word for the subject concept (in association with the opposite direction relative to the subject direction entered for the subject anchor word). The training system can then use the subject sentence data entered by the user to extract an appropriate concept expression template that can be presented to the user via the GUI of FIG. 10B.

Figure 10H:
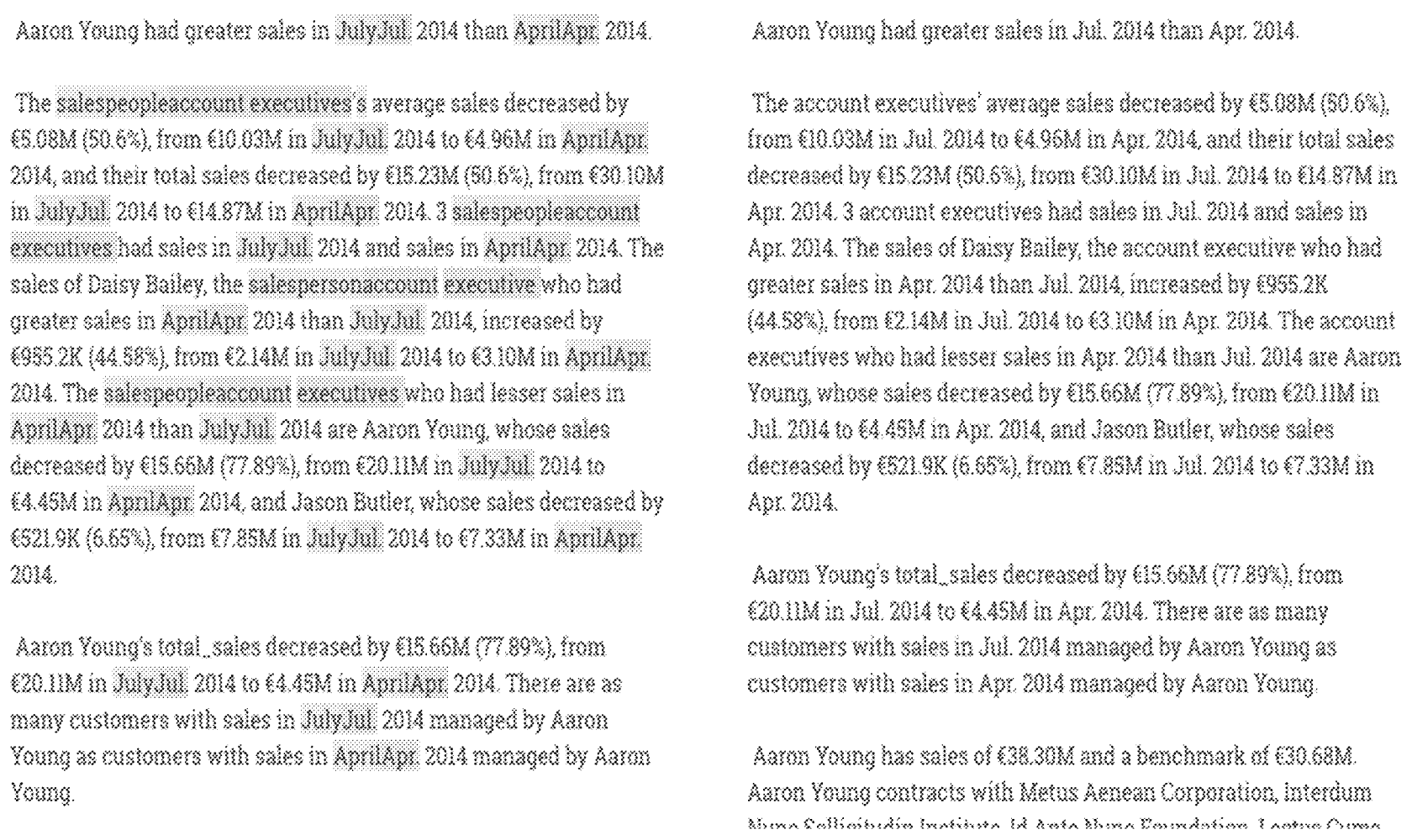

FIG. 10H shows a sample narrative generated by NLG system 108 that has been adjusted based on the configurations applied by the training system 106. The left side of FIG. 10H shows a marked-up version of the narrative produced by the trained NLG and the right side of FIG. 10H shows a clean version of the narrative produced by the trained NLG. The marked-up version shows specific edits made to the narrative as a result of the training configuration e.g., where "July" and "April" were replaced by the stylistic variants "Jul." and "Apr." respectively, where the term "salespeople" was replaced by the stylistic variant "account executive", etc.).

A parallel specification data structure can be created to capture the user decisions entered via the user interfaces around enabling/disabling the application of various extracted linguistic features from the training data. The parallel data structure which can be a parallel JSON specification can contain lists whose indexes match the original JSON specification's indexes, and each list item can be a JSON object with an "enabled" key. FIG. 11A shows an example JSON specification portion for ontological vocabulary. If the user uses the GUIs to enable the second word ("yield"), but not the first word ("income"), the parallel data structure of FIG. 11B will be produced to reflect these modifications entered via the user interface. The data structure of FIG. 11B can then be sent to an applicator alongside the original JSON specification of FIG. 11A for use programmatically during the configuration manipulation of the NLG system 108.

Also, the system 100 can expose an HTTP API that allows programmatic access to perform corpus creation, JSON specification retrieval, and platform application. This API can be used by the browser application. The endpoints and associated payloads can be described via cURL commands as reflected by FIGS. 12A and 12B. FIG. 12A shows commands for generating a specification from multiple files, where the specification is saved to a JSON file. FIG. 12B shows commands for using a specification in a JSON file to change the configuration for an NLG project.

IV. NLG Configuration/Instrumentation

The final phase of NLG training can employ a platform-specific applicator that takes the specification data structure (plus any user modifications as reflected in a parallel data structure) as an input and then updates the configuration for the NLG system 108 accordingly.

Each applicator can be responsible for defining the necessary business logic to manipulate the platform-specific configuration. It can also be responsible for initializing the necessary database/service/library connections to the platform in order to enact configuration changes. The applicator can then update the styling options for a narrative in the NLG system to reflect the extracted linguistic features for things such as date formats, number formats, etc. With respect to concept expression templates, the applicator can add them to the ontology 410 including as new expressions in the ontology 410 as appropriate (e.g., adding them as expressions to entity types, derived entity types, and/or relationships in the ontology 410 as may be appropriate). In another example embodiment, the concept expression templates can be loaded into or otherwise made available to the NLG AI (e.g., the NLG 530 shown in FIG. 5 of the above-referenced and incorporated Ser. No. 16/183,230 patent application).

An applicator iterates through feature instances for each top-level key in the JSON specification. Before applying changes, it checks the corresponding list in the user settings structure. If the user settings object in the corresponding list index position has an "enabled" key with a false value, the applicator will skip the current feature instance altogether and move on.

In an example, an applicator can process two items of input: (1) the JSON specification, and (2) an identifier for the project to be updated. The applicator then connects to the NLG system's configuration database using a configuration client library provided by the NLG system. This library can use the provided project ID to ensure that the appropriate project-specific configuration subset is accessible.

For each node in the list of vocabulary and concept features in the JSON specification, the applicator can perform the following:
1. Use the node's identifier fields to retrieve the appropriate configuration object.
   a. For vocabulary, the lookup will use the "object_type" and "object_id" fields.
   b. For concepts, the lookup will use the "concept" field.
2. Update the "parse_tree" field on configuration object with the contents of the node's "parse_tree" field.
3. Save the updated configuration object back to configuration store.

Thereafter, the next time a story is produced by the NLG system, it will load the updated configuration and express ontological entities and concepts using the updated expression forms.

While the invention has been described above in relation to its example embodiments, various modifications may be made thereto that still fall within the invention's scope. Such modifications to the invention will be recognizable upon review of the teachings herein.

What is claimed is:

1. A natural language processing method comprising:
   performing natural language processing (NLP) on training data to detect a plurality of linguistic features in the training data, wherein the training data comprises a plurality of words arranged in a natural language, and wherein the detected linguistic features include a date and number textual feature;
   generating a specification data structure based on the detected linguistic features, the specification data structure arranged for training a natural language generation (NLG) system to produce natural language output that stylistically resembles the training data including natural language output that expresses an instance of a date and/or number in a textual form in accordance with the detected date and number textual feature;
   training the NLG system based on the specification data structure to thereby configure the NLG system to produce natural language output that stylistically resembles the training data including natural language output that expresses the instance of the date and/or number in the textual form in accordance with the detected date and number textual feature; and
   the trained NLG system processing a data set to generate natural language output, wherein the natural language output includes a date and/or number that is expressed in a textual form in accordance with the detected date and number textual feature;
   wherein the performing, generating, training, and processing steps are performed by a processor.

2. The method of claim 1 wherein the specification data structure comprises a machine-readable representation of the detected linguistic features.

3. The method of claim 1 wherein the performing step comprises performing pattern matching on the training data to detect the date and number textual feature.

4. The method of claim 3 wherein the pattern matching comprises regular expression pattern matching.

5. The method of claim 1 wherein the date and number textual feature comprises a day expressions feature.

6. The method of claim 1 wherein the date and number textual feature comprises a month expressions feature.

7. The method of claim 1 wherein the date and number textual feature comprises a currency expressions feature.

8. The method of claim 1 wherein the date and number textual feature comprises a numeric expressions feature.

9. The method of claim 1 further comprising:
   modifying the specification data structure to selectively choose in response to user input which of the detected linguistic features are to be used for training the NLG system, wherein the modifying step is performed by the processor.

10. The method of claim 9 further comprising:
    providing a user interface for presentation to a user, the user interface configured to summarize the detected linguistic features; and
    receiving user input through the user interface, wherein the received user input includes commands that identify which of the detected linguistic features are to be used to train the NLG system, wherein the receiving step is performed by the processor.

11. The method of claim 1 further comprising:
    receiving the training data as text sentence input from a user.

12. The method of claim 1 further comprising:
    receiving the training data as a pre-existing document.

13. The method of claim 1 further comprising:
    receiving the training data as speech input from a user.

14. The method of any of claim 1 wherein the training data comprises a corpus of documents.

15. The method of claim 1 wherein the training data comprises a plurality of sentences, the method further comprising performing the NLP on each of a plurality of the sentences to detect a plurality of linguistic features in the sentences.

16. The method of claim 1 wherein the processor comprises a plurality of processors.

17. The method of claim 16 wherein different processors perform the performing and generating steps.

18. The method of claim 16 wherein a first processor performs the performing and generating steps, and wherein a second processor is part of the trained NLG system and performs the processing step.

19. The method of claim 1 wherein the same processor performs the performing and generating steps.

20. An apparatus for natural language processing, the apparatus comprising:
    a processor configured to (1) perform natural language processing (NLP) on training data to detect a plurality of linguistic features in the training data, wherein the training data comprises a plurality of words arranged in a natural language, and wherein the detected linguistic features include a date and number textual feature, (2) generate a specification data structure based on the detected linguistic features, the specification data structure arranged for training a natural language generation (NLG) system to produce natural language output that stylistically resembles the training data including natural language output that expresses an instance of a date and/or number in a textual form in accordance with the detected date and number textual feature, and (3) train the NLG system based on the specification data structure to thereby configure the NLG system to produce natural language output that stylistically resembles the training data including natural language output that expresses the instance of the date and/or number in the textual form in accordance with the detected date and number textual feature; and
    the trained NLG system, wherein the trained NLG system is configured to process a data set to generate natural language output, wherein the natural language output includes a date and/or number that is expressed in a textual form in accordance with the detected date and number textual feature.

21. The apparatus of claim 20 wherein the natural language output expresses an idea derived from the processed data set.

22. The apparatus of claim 20 wherein the specification data structure comprises a machine-readable representation of the detected linguistic features.

23. The apparatus of claim 20 wherein the processor is further configured to perform pattern matching on the training data to detect the date and number textual feature.

24. The apparatus of claim 23 wherein the pattern matching comprises regular expression pattern matching.

25. The apparatus of claim 20 wherein the date and number textual feature comprises a day expressions feature.

26. The apparatus of claim 25 wherein the processor is further configured to apply a plurality of different day expressions pattern matchers to the training data to detect any of a plurality of different textual forms for expressing days in the training data.

27. The apparatus of claim 26 wherein the processor is further configured to (1) determine a most common textual form for expressing days in the training data based on the different day expressions pattern matchers and (2) generate the specification data structure so that it trains the NLG system to use the most common textual form for expressing days in the produced natural language output.

28. The apparatus of claim 20 wherein the date and number textual feature comprises a month expressions feature.

29. The apparatus of claim 28 wherein the processor is further configured to apply a plurality of different month expressions pattern matchers to the training data to detect any of a plurality of different textual forms for expressing months in the training data.

30. The apparatus of claim 29 wherein the processor is further configured to (1) determine a most common textual form for expressing months in the training data based on the different month expressions pattern matchers and (2) generate the specification data structure so that it trains the NLG system to use the most common textual form for expressing months in the produced natural language output.

31. The apparatus of claim 20 wherein the date and number textual feature comprises a currency expressions feature.

32. The apparatus of claim 31 wherein the processor is further configured to apply a plurality of different currency expressions pattern matchers to the training data to detect any of a plurality of different textual forms for expressing currency values in the training data.

33. The apparatus of claim 32 wherein the processor is further configured to (1) determine a most common textual form for expressing currency values in the training data based on the different currency expressions pattern matchers and (2) generate the specification data structure so that it trains the NLG system to use the most common textual form for expressing currency values in the produced natural language output.

34. The apparatus of claim 20 wherein the date and number textual feature comprises a numeric expressions feature.

35. The apparatus of claim 34 wherein the processor is further configured to apply a plurality of different numeric expressions pattern matchers to the training data to detect any of a plurality of different textual forms for expressing integer and decimal values in the training data.

36. The apparatus of claim 35 wherein the processor is further configured to (1) determine a most common textual form for expressing integer and decimal values in the training data based on the different numeric expressions pattern matchers and (2) generate the specification data structure so that it trains the NLG system to use the most common textual form for expressing integer and decimal values in the produced natural language output.

37. The apparatus of claim 20 wherein the processor is further configured to further modify the specification data structure to selectively choose in response to user input which of the detected linguistic features are to be used for training the NLG system.

38. The apparatus of claim 37 wherein the processor is further configured to (1) provide a user interface for presentation to a user, the user interface configured to summarize the detected linguistic features, and (2) receive user input through the user interface, wherein the received user input includes commands that identify which of the detected linguistic features are to be used to train the NLG system.

39. The apparatus of claim 20 wherein the processor is further configured to receive the training data as text sentence input from a user.

40. The apparatus of claim 20 wherein the processor is further configured to receive the training data as a pre-existing document.

41. The apparatus of claim 20 wherein the processor is further configured to receive the training data as speech input from a user.

42. The apparatus of claim 20 wherein the training data comprises a corpus of documents.

43. The apparatus of claim 20 wherein the training data comprises a plurality of sentences, and wherein the processor is further configured to perform the NLP on each of a plurality of the sentences to detect a plurality of linguistic features in the sentences.

44. The apparatus of claim 20 wherein the processor comprises a plurality of processors.

45. The apparatus of claim 20 wherein the processor is part of an NLP system, and wherein the NLG system includes a different processor.

46. A computer program product for natural language processing, the computer program product comprising:
a plurality of processor-executable instructions that are resident on a non-transitory computer readable storage medium, wherein the instructions are configured, upon execution by a processor, to cause the processor to (1) perform natural language processing (NLP) on training data to detect a plurality of linguistic features in the training data, wherein the training data comprises a plurality of words arranged in a natural language, and wherein the detected linguistic features include a date and number textual feature, (2) generate a specification data structure based on the detected linguistic features, the specification data structure arranged for training a natural language generation (NLG) system to produce natural language output that stylistically resembles the training data including natural language output that expresses an instance of a date and/or number in a textual form in accordance with the detected date and number textual feature, and (3) train the NLG system based on the specification data structure to thereby configure the NLG system to produce natural language output that stylistically resembles the training data including natural language output that expresses the instance of the date and/or number in the textual form in accordance with the detected date and number textual feature, wherein the trained NLG system is configured to process a data set to generate natural language output, wherein the natural language output includes a date and/or number that is expressed in a textual form in accordance with the detected date and number textual feature.

* * * * *